US 8,872,762 B2

(12) United States Patent
Galor et al.

(10) Patent No.: US 8,872,762 B2
(45) Date of Patent: Oct. 28, 2014

(54) THREE DIMENSIONAL USER INTERFACE CURSOR CONTROL

(75) Inventors: Micha Galor, Tel Aviv (IL); Idan Gelbourt, Jerusalem (IL); Ofir Or, Ramat Gan (IL); Jonathan Pokrass, Bat-Yam (IL); Amir Hoffnung, Tel Aviv (IL)

(73) Assignee: Primesense Ltd., Tel Aviv (IL)

( * ) Notice: Subject to any disclaimer, the term of this patent is extended or adjusted under 35 U.S.C. 154(b) by 22 days.

(21) Appl. No.: 13/314,207

(22) Filed: Dec. 8, 2011

(65) Prior Publication Data

US 2012/0223882 A1   Sep. 6, 2012

Related U.S. Application Data

(60) Provisional application No. 61/420,809, filed on Dec. 8, 2010, provisional application No. 61/448,670, filed on Mar. 3, 2011, provisional application No. 61/538,970, filed on Sep. 26, 2011.

(51) Int. Cl.
*G09G 5/00* (2006.01)
*G06F 3/01* (2006.01)

(52) U.S. Cl.
CPC ............. *G06F 3/017* (2013.01); *G06F 3/011* (2013.01)
USPC .......................................... 345/156; 715/863

(58) Field of Classification Search
USPC ..................... 345/156–158; 715/700–866
See application file for complete search history.

(56) References Cited

U.S. PATENT DOCUMENTS

| 4,550,250 A | 10/1985 | Mueller et al. |
| 4,789,921 A | 12/1988 | Aho |
| 4,988,981 A | 1/1991 | Zimmerman et al. |
| 5,264,836 A | 11/1993 | Rubin |
| 5,495,576 A | 2/1996 | Ritchey |
| 5,588,139 A | 12/1996 | Lanier et al. |
| 5,594,469 A | 1/1997 | Freeman et al. |
| 5,846,134 A | 12/1998 | Latypov |
| 5,852,672 A | 12/1998 | Lu |
| 5,862,256 A | 1/1999 | Zetts et al. |

(Continued)

FOREIGN PATENT DOCUMENTS

| WO | 9935633 A2 | 7/1999 |
| WO | 03071410 A2 | 8/2003 |

(Continued)

OTHER PUBLICATIONS

Ross Miller, "Kinect for Xbox 360 review", Nov. 4, 2010, Engadget.*

(Continued)

*Primary Examiner* — Michael Pervan
(74) *Attorney, Agent, or Firm* — D. Kligler I.P. Services Ltd.

(57) ABSTRACT

A method, including receiving, by a computer executing a non-tactile three dimensional (3D) user interface, a first set of multiple 3D coordinates representing a gesture performed by a user positioned within a field of view of a sensing device coupled to the computer, the first set of 3D coordinates comprising multiple points in a fixed 3D coordinate system local to the sensing device. The first set of multiple 3D coordinates are transformed to a second set of corresponding multiple 3D coordinates in a subjective 3D coordinate system local to the user.

15 Claims, 9 Drawing Sheets

(56) References Cited

U.S. PATENT DOCUMENTS

| | | | |
|---|---|---|---|
| 5,864,635 A | 1/1999 | Zetts et al. | |
| 5,870,196 A | 2/1999 | Lulli et al. | |
| 5,917,937 A | 6/1999 | Szeliski et al. | |
| 5,973,700 A | 10/1999 | Taylor et al. | |
| 6,002,808 A | 12/1999 | Freeman | |
| 6,005,548 A * | 12/1999 | Latypov et al. | 345/156 |
| 6,064,387 A * | 5/2000 | Canaday et al. | 715/839 |
| 6,072,494 A | 6/2000 | Nguyen | |
| 6,084,979 A | 7/2000 | Kanade et al. | |
| 6,111,580 A | 8/2000 | Kazama et al. | |
| 6,191,773 B1 | 2/2001 | Maruno et al. | |
| 6,215,890 B1 | 4/2001 | Matsuo et al. | |
| 6,243,054 B1 | 6/2001 | DeLuca | |
| 6,252,988 B1 | 6/2001 | Ho | |
| 6,256,033 B1 | 7/2001 | Nguyen | |
| 6,262,740 B1 | 7/2001 | Lauer et al. | |
| 6,345,111 B1 | 2/2002 | Yamaguchi et al. | |
| 6,345,893 B2 | 2/2002 | Fateh et al. | |
| 6,452,584 B1 | 9/2002 | Walker et al. | |
| 6,456,262 B1 | 9/2002 | Bell | |
| 6,507,353 B1 | 1/2003 | Huard et al. | |
| 6,512,838 B1 | 1/2003 | Rafii et al. | |
| 6,519,363 B1 | 2/2003 | Su et al. | |
| 6,559,813 B1 | 5/2003 | DeLuca et al. | |
| 6,681,031 B2 | 1/2004 | Cohen et al. | |
| 6,686,921 B1 | 2/2004 | Rushmeier et al. | |
| 6,690,370 B2 | 2/2004 | Ellenby et al. | |
| 6,741,251 B2 | 5/2004 | Malzbender | |
| 6,791,540 B1 | 9/2004 | Baumberg | |
| 6,803,928 B2 | 10/2004 | Bimber et al. | |
| 6,853,935 B2 | 2/2005 | Satoh et al. | |
| 6,857,746 B2 | 2/2005 | Dyner | |
| 6,951,515 B2 | 10/2005 | Ohshima et al. | |
| 6,977,654 B2 | 12/2005 | Malik et al. | |
| 7,003,134 B1 | 2/2006 | Covell et al. | |
| 7,013,046 B2 | 3/2006 | Kawamura et al. | |
| 7,023,436 B2 | 4/2006 | Segawa et al. | |
| 7,042,440 B2 | 5/2006 | Pryor et al. | |
| 7,042,442 B1 | 5/2006 | Kanevsky et al. | |
| 7,151,530 B2 | 12/2006 | Roeber et al. | |
| 7,170,492 B2 | 1/2007 | Bell | |
| 7,215,815 B2 | 5/2007 | Honda | |
| 7,227,526 B2 | 6/2007 | Hildreth et al. | |
| 7,257,237 B1 | 8/2007 | Luck et al. | |
| 7,259,747 B2 | 8/2007 | Bell | |
| 7,264,554 B2 | 9/2007 | Bentley | |
| 7,289,227 B2 | 10/2007 | Smetak et al. | |
| 7,289,645 B2 | 10/2007 | Yamamoto et al. | |
| 7,295,697 B1 | 11/2007 | Satoh | |
| 7,301,648 B2 | 11/2007 | Foxlin | |
| 7,302,099 B2 | 11/2007 | Zhang et al. | |
| 7,333,113 B2 | 2/2008 | Gordon | |
| 7,340,077 B2 | 3/2008 | Gokturk | |
| 7,348,963 B2 | 3/2008 | Bell | |
| 7,358,972 B2 | 4/2008 | Gordon et al. | |
| 7,370,883 B2 | 5/2008 | Basir et al. | |
| 7,427,996 B2 | 9/2008 | Yonezawa et al. | |
| 7,428,542 B1 | 9/2008 | Fink et al. | |
| 7,474,256 B2 | 1/2009 | Ohta et al. | |
| 7,508,377 B2 | 3/2009 | Pihlaja et al. | |
| 7,526,120 B2 | 4/2009 | Gokturk et al. | |
| 7,536,032 B2 | 5/2009 | Bell | |
| 7,573,480 B2 | 8/2009 | Gordon | |
| 7,576,727 B2 | 8/2009 | Bell | |
| 7,580,572 B2 | 8/2009 | Bang et al. | |
| 7,590,941 B2 | 9/2009 | Wee et al. | |
| 7,688,998 B2 | 3/2010 | Tuma et al. | |
| 7,696,876 B2 | 4/2010 | Dimmer et al. | |
| 7,724,250 B2 | 5/2010 | Ishii et al. | |
| 7,762,665 B2 | 7/2010 | Vertegaal et al. | |
| 7,774,155 B2 | 8/2010 | Sato et al. | |
| 7,812,842 B2 | 10/2010 | Gordon | |
| 7,821,541 B2 | 10/2010 | Delean | |
| 7,840,031 B2 | 11/2010 | Albertson et al. | |
| 7,844,914 B2 | 11/2010 | Andre et al. | |
| 7,925,549 B2 | 4/2011 | Looney et al. | |
| 7,971,156 B2 | 6/2011 | Albertson et al. | |
| 8,154,781 B2 | 4/2012 | Kroll et al. | |
| 8,166,421 B2 * | 4/2012 | Magal et al. | 715/863 |
| 8,183,977 B2 | 5/2012 | Matsumoto | |
| 8,194,921 B2 | 6/2012 | Kongqiao et al. | |
| 8,214,098 B2 | 7/2012 | Murray et al. | |
| 8,218,211 B2 | 7/2012 | Kroll et al. | |
| 8,368,647 B2 | 2/2013 | Lin | |
| 8,405,604 B2 | 3/2013 | Pryor et al. | |
| 8,416,276 B2 | 4/2013 | Kroll et al. | |
| 8,446,459 B2 | 5/2013 | Fang et al. | |
| 8,448,083 B1 | 5/2013 | Migos et al. | |
| 8,462,199 B2 | 6/2013 | Givon | |
| 8,514,221 B2 | 8/2013 | King et al. | |
| 8,514,251 B2 | 8/2013 | Hildreth et al. | |
| 8,625,882 B2 | 1/2014 | Backlund et al. | |
| 2002/0057383 A1 | 5/2002 | Iwamura | |
| 2002/0071607 A1 | 6/2002 | Kawamura et al. | |
| 2002/0158873 A1 | 10/2002 | Williamson | |
| 2003/0057972 A1 | 3/2003 | Pfaff et al. | |
| 2003/0063775 A1 | 4/2003 | Rafii et al. | |
| 2003/0088463 A1 | 5/2003 | Kanevsky | |
| 2003/0156756 A1 | 8/2003 | Gokturk et al. | |
| 2003/0185444 A1 | 10/2003 | Honda | |
| 2003/0227453 A1 | 12/2003 | Beier et al. | |
| 2003/0235341 A1 | 12/2003 | Gokturk et al. | |
| 2004/0046744 A1 | 3/2004 | Rafii et al. | |
| 2004/0104935 A1 | 6/2004 | Williamson | |
| 2004/0135744 A1 | 7/2004 | Bimber et al. | |
| 2004/0155962 A1 | 8/2004 | Marks | |
| 2004/0174770 A1 | 9/2004 | Rees | |
| 2004/0183775 A1 | 9/2004 | Bell | |
| 2004/0184640 A1 | 9/2004 | Bang et al. | |
| 2004/0184659 A1 | 9/2004 | Bang et al. | |
| 2004/0193413 A1 | 9/2004 | Wilson et al. | |
| 2004/0258314 A1 | 12/2004 | Hashimoto | |
| 2005/0031166 A1 | 2/2005 | Fujimura et al. | |
| 2005/0088407 A1 | 4/2005 | Bell et al. | |
| 2005/0089194 A1 | 4/2005 | Bell | |
| 2005/0110964 A1 | 5/2005 | Bell et al. | |
| 2005/0122308 A1 | 6/2005 | Bell et al. | |
| 2005/0162381 A1 | 7/2005 | Bell et al. | |
| 2005/0190972 A1 | 9/2005 | Thomas et al. | |
| 2005/0254726 A1 | 11/2005 | Fuchs et al. | |
| 2005/0265583 A1 | 12/2005 | Covell et al. | |
| 2006/0010400 A1 | 1/2006 | Dehlin et al. | |
| 2006/0092138 A1 | 5/2006 | Kim et al. | |
| 2006/0110008 A1 | 5/2006 | Vertegaal et al. | |
| 2006/0115155 A1 | 6/2006 | Lui et al. | |
| 2006/0139314 A1 | 6/2006 | Bell | |
| 2006/0149737 A1 | 7/2006 | Du et al. | |
| 2006/0159344 A1 | 7/2006 | Shao et al. | |
| 2006/0187196 A1 | 8/2006 | Underkoffler et al. | |
| 2006/0239670 A1 | 10/2006 | Cleveland | |
| 2006/0248475 A1 | 11/2006 | Abrahamsson | |
| 2007/0078552 A1 | 4/2007 | Rosenberg | |
| 2007/0130547 A1 | 6/2007 | Boillot | |
| 2007/0154116 A1 | 7/2007 | Shieh | |
| 2007/0230789 A1 | 10/2007 | Chang et al. | |
| 2007/0285554 A1 | 12/2007 | Givon | |
| 2008/0030460 A1 | 2/2008 | Hildreth et al. | |
| 2008/0062123 A1 | 3/2008 | Bell | |
| 2008/0094371 A1 | 4/2008 | Forstall et al. | |
| 2008/0123940 A1 | 5/2008 | Kundu et al. | |
| 2008/0150890 A1 | 6/2008 | Bell et al. | |
| 2008/0150913 A1 | 6/2008 | Bell et al. | |
| 2008/0170776 A1 | 7/2008 | Albertson et al. | |
| 2008/0236902 A1 | 10/2008 | Imaizumi | |
| 2008/0252596 A1 | 10/2008 | Bell et al. | |
| 2008/0256494 A1 | 10/2008 | Greenfield | |
| 2008/0260250 A1 | 10/2008 | Vardi | |
| 2008/0281583 A1 | 11/2008 | Slothouber et al. | |
| 2008/0287189 A1 | 11/2008 | Rabin | |
| 2009/0009593 A1 | 1/2009 | Cameron et al. | |
| 2009/0027335 A1 | 1/2009 | Ye | |
| 2009/0027337 A1 | 1/2009 | Hildreth | |
| 2009/0031240 A1 | 1/2009 | Hildreth | |
| 2009/0040215 A1 | 2/2009 | Afzulpurkar et al. | |

(56) References Cited

U.S. PATENT DOCUMENTS

| | | |
|---|---|---|
| 2009/0073117 A1 | 3/2009 | Tsurumi et al. |
| 2009/0077504 A1 | 3/2009 | Bell |
| 2009/0078473 A1 | 3/2009 | Overgard et al. |
| 2009/0083122 A1 | 3/2009 | Angell et al. |
| 2009/0083622 A1 | 3/2009 | Chien et al. |
| 2009/0096783 A1 | 4/2009 | Shpunt et al. |
| 2009/0183125 A1 | 7/2009 | Magal et al. |
| 2009/0195392 A1 | 8/2009 | Zalewski |
| 2009/0228841 A1 | 9/2009 | Hildreth |
| 2009/0256817 A1 | 10/2009 | Perlin et al. |
| 2009/0284542 A1 | 11/2009 | Baar et al. |
| 2009/0297028 A1 | 12/2009 | De Haan |
| 2010/0002936 A1 | 1/2010 | Khomo et al. |
| 2010/0007717 A1 | 1/2010 | Spektor et al. |
| 2010/0034457 A1 | 2/2010 | Berliner et al. |
| 2010/0036717 A1 | 2/2010 | Trest |
| 2010/0053151 A1 | 3/2010 | Marti et al. |
| 2010/0071965 A1 | 3/2010 | Hu et al. |
| 2010/0083189 A1 | 4/2010 | Arlein et al. |
| 2010/0103106 A1 | 4/2010 | Chui |
| 2010/0149096 A1 | 6/2010 | Migos et al. |
| 2010/0164897 A1 | 7/2010 | Morin et al. |
| 2010/0177933 A1 | 7/2010 | Willmann et al. |
| 2010/0199228 A1* | 8/2010 | Latta et al. ............... 715/863 |
| 2010/0199231 A1 | 8/2010 | Markovic et al. |
| 2010/0234094 A1 | 9/2010 | Gagner et al. |
| 2010/0235786 A1 | 9/2010 | Maizels et al. |
| 2010/0295781 A1 | 11/2010 | Alameh et al. |
| 2011/0006978 A1 | 1/2011 | Yuan |
| 2011/0007035 A1 | 1/2011 | Shai |
| 2011/0018795 A1 | 1/2011 | Jang |
| 2011/0029918 A1 | 2/2011 | Yoo et al. |
| 2011/0052006 A1 | 3/2011 | Gurman et al. |
| 2011/0081072 A1 | 4/2011 | Kawasaki et al. |
| 2011/0087970 A1 | 4/2011 | Swink et al. |
| 2011/0144543 A1 | 6/2011 | Tsuzuki et al. |
| 2011/0164032 A1 | 7/2011 | Shadmi |
| 2011/0164141 A1 | 7/2011 | Tico et al. |
| 2011/0193939 A1 | 8/2011 | Vassigh et al. |
| 2011/0211754 A1 | 9/2011 | Litvak et al. |
| 2011/0225536 A1 | 9/2011 | Shams et al. |
| 2011/0227820 A1 | 9/2011 | Haddick et al. |
| 2011/0231757 A1 | 9/2011 | Haddick et al. |
| 2011/0242102 A1 | 10/2011 | Hess |
| 2011/0248914 A1 | 10/2011 | Sherr |
| 2011/0254765 A1 | 10/2011 | Brand |
| 2011/0254798 A1 | 10/2011 | Adamson et al. |
| 2011/0260965 A1 | 10/2011 | Kim et al. |
| 2011/0261058 A1 | 10/2011 | Luo |
| 2011/0279397 A1 | 11/2011 | Rimon et al. |
| 2011/0291926 A1 | 12/2011 | Gokturk et al. |
| 2011/0292036 A1 | 12/2011 | Sali et al. |
| 2011/0293137 A1 | 12/2011 | Gurman et al. |
| 2011/0296353 A1 | 12/2011 | Ahmed et al. |
| 2011/0310010 A1 | 12/2011 | Hoffnung et al. |
| 2012/0001875 A1 | 1/2012 | Li et al. |
| 2012/0038550 A1 | 2/2012 | Lemmey et al. |
| 2012/0078614 A1 | 3/2012 | Galor et al. |
| 2012/0117514 A1 | 5/2012 | Kim et al. |
| 2012/0169583 A1 | 7/2012 | Rippel et al. |
| 2012/0202569 A1 | 8/2012 | Maizels et al. |
| 2012/0204133 A1 | 8/2012 | Guendelman et al. |
| 2012/0223882 A1 | 9/2012 | Galor et al. |
| 2012/0249416 A1 | 10/2012 | Maciocci et al. |
| 2012/0268369 A1 | 10/2012 | Kikkeri |
| 2012/0275680 A1 | 11/2012 | Omi |
| 2012/0313848 A1 | 12/2012 | Galor et al. |
| 2012/0320080 A1 | 12/2012 | Giese et al. |
| 2013/0002801 A1 | 1/2013 | Mock |
| 2013/0014052 A1 | 1/2013 | Frey et al. |
| 2013/0044053 A1 | 2/2013 | Galor et al. |
| 2013/0055120 A1 | 2/2013 | Galor et al. |
| 2013/0055150 A1 | 2/2013 | Galor |
| 2013/0058565 A1 | 3/2013 | Rafii et al. |
| 2013/0106692 A1 | 5/2013 | Maizels et al. |
| 2013/0107021 A1 | 5/2013 | Maizels et al. |
| 2013/0155070 A1 | 6/2013 | Luo |
| 2013/0207920 A1 | 8/2013 | McCann et al. |
| 2014/0108930 A1 | 4/2014 | Asnis |

FOREIGN PATENT DOCUMENTS

| | | |
|---|---|---|
| WO | 2004107272 A1 | 12/2004 |
| WO | 2005003948 A1 | 1/2005 |
| WO | 2005094958 A1 | 10/2005 |
| WO | 2007043036 A1 | 4/2007 |
| WO | 2007078639 A1 | 7/2007 |
| WO | 2007105205 A2 | 9/2007 |
| WO | 2007132451 A2 | 11/2007 |
| WO | 2007135376 A2 | 11/2007 |
| WO | 2008120217 A2 | 10/2008 |
| WO | 2012011044 A1 | 1/2012 |
| WO | 2012020380 A1 | 2/2012 |
| WO | 2012107892 A1 | 8/2012 |

OTHER PUBLICATIONS

International Application PCT/IB2012/050577 Search Report dated Aug. 6, 2012.

U.S. Appl. No. 12/683,452 Official Action dated Sep. 7, 2012.

Koutek, M., "Scientific Visualization in Virtual Reality: Interaction Techniques and Application Development", PhD Thesis, Delft University of Technology, 264 pages, Jan. 2003.

Azuma et al., "Recent Advances in Augmented Reality", IEEE Computer Graphics and Applications, vol. 21, issue 6, pp. 34-47, Nov. 2001.

Breen et al., "Interactive Occlusion and Collision of Real and Virtual Objects in Augmented Reality", Technical Report ECRC-95-02, ECRC, Munich, Germany, 22 pages, year 1995.

Burdea et al., "A Distributed Virtual Environment with Dextrous Force Feedback", Proceedings of Interface to Real and Virtual Worlds Conference, pp. 255-265, Mar. 1992.

Gargallo et al., "Bayesian 3D Modeling from Images Using Multiple Depth Maps", Proceedings of the IEEE Computer Society Conference on Computer Vision and Pattern Recognition (CVPR'05), vol. 2, pp. 885-891, Jun. 20-25, 2005.

Gobbetti et al., "VB2: an Architecture for Interaction in Synthetic Worlds", Proceedings of the 6th Annual ACM Symposium on User Interface Software and Technology (UIST'93), pp. 167-178, Nov. 3-5, 1993.

Ohta et al., "Share-Z: Client/Server Depth Sensing for See-Through Head-Mounted Displays", Presence: Teleoperators and Virtual Environments, vol. 11, No. 2, pp. 176-188, Apr. 2002.

Schmalstieg et al., "The Studierstube Augmented Reality Project", Presence: Teleoperators and Virtual Environments, vol. 11, No. 1, pp. 33-54, Feb. 2002.

Sun et al., "SRP Based Natural Interaction Between Real and Virtual Worlds in Augmented Reality", Proceedings of the International Conference on Cyberworlds (CW'08), pp. 117-124, Sep. 22-24, 2008.

U.S. Appl. No. 13/541,786, filed Jul. 5, 2012.

U.S. Appl. No. 13/592,352, filed Aug. 23, 2012.

U.S. Appl. No. 13/584,831, filed Aug. 14, 2012.

U.S. Appl. No. 13/592,369, filed Aug. 23, 2012.

Bleiwess et al., "Fusing Time-of-Flight Depth and Color for Real-Time Segmentation and Tracking", Dyn3D 2009, Lecture Notes in Computer Science 5742, pp. 58-69, Jena, Germany, Sep. 9, 2009.

Bleiwess et al., "Markerless Motion Capture Using a Single Depth Sensor", SIGGRAPH Asia 2009, Yokohama, Japan, Dec. 16-19, 2009.

Bevilacqua et al., "People Tracking Using a Time-Of-Flight Depth Sensor", Proceedings of the IEEE International Conference on Video and Signal Based Surveillance, Sydney, Australia, Nov. 22-24, 2006.

Bradski, G., "Computer Vision Face Tracking for Use in a Perceptual User Interface", Intel Technology Journal, vol. 2, issue 2 (2nd Quarter 2008).

Comaniciu et al., "Kernel-Based Object Tracking", IEEE Transactions on Pattern Analysis and Machine Intelligence, vol. 25, No. 5, pp. 564-577, May 2003.

(56) References Cited

OTHER PUBLICATIONS

Gesturetec Inc., "Gesture Control Solutions for Consumer Devices", Canada, 2009.
Gokturk et al., "A Time-Of-Flight Depth Sensor—System Description, Issues and Solutions", Proceedings of the 2004 Conference on Computer Vision and Patter Recognition Workshop (CVPRW'04), vol. 3, pp. 35, Jun. 27-Jul. 2, 2004.
Grest et al., "Single View Motion Tracking by Depth and Silhouette Information", SCIA 2007—Scandinavian Conference on Image Analysis, Lecture Notes in Computer Science 4522, pp. 719-729, Aalborg, Denmark, Jun. 10-14, 2007.
Haritaoglu et al., "Ghost 3d: Detecting Body Posture and Parts Using Stereo", Proceedings of the IEEE Workshop on Motion and Video Computing (Motion'02), pp. 175-180, Orlando, USA, Dec. 5-6, 2002.
Haritaoglu et al., "W4S : A real-time system for detecting and tracking people in 2<1/2>D", ECCV 98—5th European conference on computer vision, vol. 1407, pp. 877-892, Freiburg , Germany, Jun. 2-6, 1998.
Harville, M., "Stereo Person Tracking with Short and Long Term Plan-View Appearance Models of Shape and Color", Proceedings of the IEEE International Conference on Advanced Video and Signal-Based Surveillance (AVSSS—2005), pp. 522-527, Como, Italy, Sep. 15-16, 2005.
Holte, M., "Fusion of Range and Intensity Information for View Invariant Gesture Recognition", IEEE Conference on Computer Vision and Pattern Recognition Workshops (CVPRW '08), pp. 1-7, Anchorage, USA, Jun. 23-28, 2008.
Kaewtrakulpong et al., "An Improved Adaptive Background Mixture Model for Real-Time Tracking with Shadow Detection", Proceedings of the 2nd European Workshop on Advanced Video Based Surveillance Systems (AVBS'01), Kingston, UK, Sep. 2001.
Kolb et al., "ToF-Sensors: New Dimensions for Realism and Interactivity", Proceedings of the IEEE Conference on Computer Vision and Patter Recognition Workshops, pp. 1-6, Anchorage, USA, Jun. 23-28, 2008.
Kolsch et al., "Fast 2D Hand Tracking with Flocks of Features and Multi-Cue Integration", IEEE Workshop on Real-Time Vision for Human Computer Interaction (at CVPR'04), Washington, USA, Jun. 27-Jul. 2, 2004.
Krumm et al., "Multi-Camera Multi-Person Tracking for EasyLiving", 3rd IEEE International Workshop on Visual Surveillance, Dublin, Ireland, Jul. 1, 2000.
Leens et al., "Combining Color, Depth, and Motion for Video Segmentation", ICVS 2009—7th International Conference on Computer Vision Systems, Liege, Belgium Oct. 13-15, 2009.
MacCormick et al., "Partitioned Sampling, Articulated Objects, and Interface-Quality Hand Tracking", ECCV '00—Proceedings of the 6th European Conference on Computer Vision-Part II , pp. 3-19, Dublin, Ireland, Jun. 26-Jul. 1, 2000.
Malassiotis et al., "Real-Time Hand Posture Recognition Using Range Data", Image and Vision Computing, vol. 26, No. 7, pp. 1027-1037, Jul. 2, 2008.
Morano et al., "Structured Light Using Pseudorandom Codes", IEEE Transactions on Pattern Analysis and Machine Intelligence, vol. 20, issue 3, pp. 322-327, Mar. 1998.
Munoz-Salinas et al., "People Detection and Tracking Using Stereo Vision and Color", Image and Vision Computing, vol. 25, No. 6, pp. 995-1007, Jun. 1, 2007.
Nanda et al., "Visual Tracking Using Depth Data", Proceedings of the 2004 Conference on Computer Vision and Patter Recognition Workshop, vol. 3, Washington, USA, Jun. 27-Jul. 2, 2004.
Scharstein et al., "High-Accuracy Stereo Depth Maps Using Structured Light", IEEE Conference on Computer Vision and Patter Recognition, vol. 1, pp. 195-2002, Madison, USA, Jun. 2003.
Shi et al., "Good Features to Track", IEEE Conference on Computer Vision and Pattern Recognition, pp. 593-600, Seattle, USA, Jun. 21-23, 1994.
Siddiqui et al., "Robust Real-Time Upper Body Limb Detection and Tracking", Proceedings of the 4th ACM International Workshop on Video Surveillance and Sensor Networks, Santa Barbara, USA, Oct. 27, 2006.
Softkinetic S.A., IISU™—3D Gesture Recognition Platform for Developers of 3D Applications, Belgium, Brussels, 2007-2010.
Sudderth et al., "Visual Hand Tracking Using Nonparametric Belief Propagation", IEEE Workshop on Generative Model Based Vision at CVPR'04, Washington, USA, Jun. 27-Jul. 2, 2004.
Tsap, L., "Gesture-Tracking in Real Time with Dynamic Regional Range Computation", Real-Time Imaging, vol. 8, issue 2, pp. 115-126, Apr. 2002.
Xu et al., "A Multi-Cue-Based Human Body Tracking System", Proceedings of the 5ths International Conference on Computer Vision Systems (ICVS 2007), Germany, Mar. 21-24, 2007.
Xu et al., "Human Detecting Using Depth and Gray Images", Proceedings of the IEE Conference on Advanced Video and Signal Based Surveillance (AVSS'03), Miami, USA, Jul. 21-22, 2003.
Yilmaz et al., "Object Tracking: A Survey", ACM Computing Surveys, vol. 38, No. 4, article 13, Dec. 2006.
Zhu et al., "Controlled Human Pose Estimation From Depth Image Streams", IEEE Conference on Computer Vision and Patter Recognition Workshops, pp. 1-8, Anchorage, USA, Jun. 23-27, 2008.
International Application PCT/IB2010/051055 Search Report dated Sep. 1, 2010.
La Viola, J. Jr., "Whole-Hand and Speech Input in Virtual Environments", Computer Science Department, Florida Atlantic University, USA, 1996.
Martell, C., "Form: An Experiment in the Annotation of the Kinematics of Gesture", Dissertation, Computer and Information Science, University of Pennsylvania, 2005.
U.S. Appl. No. 12/352,622 Official Action dated Mar. 31, 2011.
Prime Sense Inc., "Prime Sensor™ Nite 1.1 Framework Programmer's Guide", Version 1.2, year 2009.
PrimeSense Corporation, "PrimeSensor Reference Design 1.08", USA, year 2010.
International Application PCT/IB2012/050577 filed on Feb. 9, 2012.
U.S. Appl. No. 61/615,403, filed Mar. 26, 2012.
U.S. Appl. No. 61/603,949, filed Feb. 28, 2012.
U.S. Appl. No. 61/525,771, filed Aug. 21, 2011.
U.S. Appl. No. 13/295,106, filed Nov. 14, 2011.
U.S. Appl. No. 61/538,970, filed Sep. 26, 2011.
U.S. Appl. No. 61/526,696, filed Aug. 24, 2011.
U.S. Appl. No. 61/526,692, filed Aug. 24, 2011.
U.S. Appl. No. 13/314,210, filed Dec. 8, 2011.
U.S. Appl. No. 12/352,622 Official Action dated Sep. 30, 2011.
International Application PCT/IB2011/053192 Search Report dated Dec. 6, 2011.
Hart, D., U.S. Appl. No. 09/616,606 "Method and System for High Resolution , Ultra Fast 3-D Imaging", filed Jul. 14, 2000.
International Application PCT/IL2007/000306 Search Report dated Oct. 2, 2008.
International Application PCT/IL2007/000574 Search Report dated Sep. 10, 2008.
International Application PCT/IL2006/000335 Preliminary Report on Patentability dated Apr. 24, 2008.
Avidan et al., "Trajectory triangulation: 3D reconstruction of moving points from amonocular image sequence", IEEE Transactions on Pattern Analysis and Machine Intelligence (PAMI), vol. 22, No. 4, pp. 348-3537, Apr. 2000.
Leclerc et al., "The direct computation of height from shading", The Proceedings of the IEEE Computer Society Conference on Computer Vision and Pattern Recognition (CVPR), pp. 552-558, USA, Jun. 1991.
Zhang et al., "Shape from intensity gradient", IEEE Transactions on Systems, Man and Cybernetics-Part A: Systems and Humans, vol. 29, No. 3, pp. 318-325, May 1999.
Zhang et al., "Height recovery from intensity gradients", IEEE Computer Society Conference on Computer Vision and Pattern Recognition (CVPR), pp. 508-513, Jun. 21-23, 1994.
Horn, B., "Height and gradient from shading", International Journal of Computer Vision, vol. 5, No. 1, pp. 37-76, Aug. 1990.

(56) References Cited

OTHER PUBLICATIONS

Bruckstein, A., "On shape from shading", Computer Vision, Graphics & Image Processing, vol. 44, pp. 139-154, year 1988.
Zhang et al., "Rapid Shape Acquisition Using Color Structured Light and Multi-Pass Dynamic Programming", 1st International Symposium on 3D Data Processing Visualization and Transmission (3DPVT), Italy, Jul. 2002.
Besl, P., "Active, Optical Range Imaging Sensors", Machine vision and applications, vol. 1, pp. 127-152, year 1988.
Horn et al., "Toward optimal structured light patterns", Proceedings of International Conference on Recent Advances in 3D Digital Imaging and Modeling, pp. 28-37, Ottawa, Canada, May 1997.
Goodman, J.W., "Statistical Properties of Laser Speckle Patterns", Laser Speckle and Related Phenomena, pp. 9-75, Springer-Verlag, Berlin Heidelberg, 1975.
Asada et al., "Determining Surface Orientation by Projecting a Stripe Pattern", IEEE Transactions on Pattern Analysis and Machine Intelligence (PAMI), vol. 10, No. 5, pp. 749-754, Sep. 1988.
Winkelbach et al., "Shape from Single Stripe Pattern Illumination", Luc Van Gool (Editor), (DAGM 2002), Lecture Notes in Computer Science 2449, p. 240-247, Springer 2002.
Koninckx et al., "Efficient, Active 3D Acquisition, based on a Pattern-Specific Snake", Luc Van Gool (Editor), (DAGM 2002), Lecture Notes in Computer Science 2449, pp. 557-565, Springer 2002.
Kimmel et al., "Analyzing and synthesizing images by evolving curves with the Osher-Sethian method", International Journal of Computer Vision, vol. 24, No. 1, pp. 37-56, year 1997.
Zigelman et al., "Texture mapping using surface flattening via multi-dimensional scaling", IEEE Transactions on Visualization and Computer Graphics, vol. 8, No. 2, pp. 198-207, Apr. 2002.
Dainty, J.C., "Introduction", Laser Speckle and Related Phenomena, pp. 1-7, Springer-Verlag, Berlin Heidelberg, 1975.
Mendlovic et al., "Composite harmonic filters for scale, projection and shift invariant pattern recognition", Applied Optics Journal, vol. 34, No. 2, Jan. 10, 1995.
Fua et al., "Human Shape and Motion Recovery Using Animation Models", 19th Congress, International Society for Photogrammetry and Remote Sensing, Amsterdam, The Netherlands, Jul. 2000.
Allard et al., "Marker-less Real Time 3D modeling for Virtual Reality", Immersive Projection Technology, Iowa State University, year 2004.
Howe et al., "Bayesian Reconstruction of 3D Human Motion from Single-Camera Video", Advanced in Neural Information Processing Systems, vol. 12, pp. 820-826, USA 1999.
Li et al., "Real-Time 3D Motion Tracking with Known Geometric Models", Real-Time Imaging Journal, vol. 5, pp. 167-187, Academic Press 1999.
Grammalidis et al., "3-D Human Body Tracking from Depth Images Using Analysis by Synthesis", Proceedings of the IEEE International Conference on Image Processing (ICIP2001), pp. 185-188, Greece, Oct. 7-10, 2001.
Segen et al., "Shadow gestures: 3D hand pose estimation using a single camera", Proceedings of IEEE International Conference on Computer Vision and Pattern Recognition, pp. 479-485, Fort Collins, USA, 1999.
Vogler et al., "ASL recognition based on a coupling between HMMs and 3D motion analysis", Proceedings of IEEE International Conference on Computer Vision, pp. 363-369, Mumbai, India, 1998.
Nam et al., "Recognition of Hand Gestures with 3D, Nonlinear Arm Movements", Pattern Recognition Letters, vol. 18, No. 1, pp. 105-113, Elsevier Science B.V. 1997.
Nesbat, S., "A System for Fast, Full-Text Entry for Small Electronic Devices", Proceedings of the 5th International Conference on Multimodal Interfaces, ICMI 2003, Vancouver, Nov. 5-7, 2003.
Ascension Technology Corporation, "Flock of Birds: Real-Time Motion Tracking", 2008.
Segen et al., "Human-computer interaction using gesture recognition and 3D hand tracking", ICIP 98, Proceedings of the IEEE International Conference on Image Processing, vol. 3, pp. 188-192, Oct. 4-7, 1998.
Dekker, L., "Building Symbolic Information for 3D Human Body Modeling from Range Data", Proceedings of the Second International Conference on 3D Digital Imaging and Modeling, IEEE computer Society, pp. 388-397, 1999.
Holte et al., "Gesture Recognition using a Range Camera", Technical Report CVMT-07-01 ISSN 1601-3646, Feb. 2007.
Cheng et al., "Articulated Human Body Pose Inference from Voxel Data Using a Kinematically Constrained Gaussian Mixture Model", CVPR EHuM2: 2nd Workshop on Evaluation of Articulated Human Motion and Pose Estimation, 2007.
U.S. Appl. No. 61/523,404, filed Aug. 15, 2011.
U.S. Appl. No. 61/504,339, filed Jul. 5, 2011.
U.S. Appl. No. 61/521,448, filed Aug. 9, 2011.
U.S. Appl. No. 61/523,349, filed Aug. 14, 2011.
PrimeSense, "Natural Interaction", YouTube Presentation, Jun. 9, 2010 http://www.youtube.com/watch?v=TzLKsex43z1~.
U.S. Appl. No. 13/423,322, filed Mar. 19, 2012.
U.S. Appl. No. 13/423,314, filed Mar. 19, 2012.
Tobii Technology, "The World Leader in Eye Tracking and Gaze Interaction", Mar. 2012.
Noveron, "Madison video eyewear", year 2012.
U.S. Appl. No. 12/762,336 Official Action dated May 15, 2012.
Manning et al., "Foundations of Statistical Natural Language Processing", chapters 6,7,9 and 12, MIT Press 1999.
Commission Regulation (EC) No. 1275/2008, Official Journal of the European Union, Dec. 17, 2008.
Arm Ltd., "AMBA Specification: AHB", Version 2, pp. 35-92, year 1999.
PrimeSense Corporation, "PrimeSensor NITE 1.1", USA, year 2010.
Microvision Inc., "PicoP® Display Engine—How it Works", 1996-2012.
Gordon et al., "The use of Dense Stereo Range Date in Augmented Reality", Proceedings of the 1st International Symposium on Mixed and Augmented Reality (ISMAR), Darmstadt, Germany, pp. 1-10, Sep. 30-Oct. 1, 2002.
Agrawala et al., "The two-user Responsive Workbench :support for collaboration through individual views of a shared space", Proceedings on the 24th conference on computer graphics and interactive techniques (SIGGRAPH 97), Los Angeles, USA, pp. 327-332, Aug. 3-8, 1997.
Harman et al., "Rapid 2D-to 3D conversion", Proceedings of SPIE Conference on Stereoscopic Displays and Virtual Reality Systems, vol. 4660, pp. 78-86, Jan. 21-23, 2002.
Hoff et al., "Analysis of head pose accuracy in augmented reality", IEEE Transactions on Visualization and Computer Graphics, vol. 6, No. 4, pp. 319-334, Oct.-Dec. 2000.
Poupyrev et al., "The go-go interaction technique: non-liner mapping for direct manipulation in VR", Proceedings of the 9th annual ACM Symposium on User interface software and technology (UIST '96), Washington, USA, pp. 79-80, Nov. 6-8, 1996.
Wexelblat et al., "Virtual Reality Applications and Explorations", Academic Press Inc., San Diego, USA, 262 pages, year 1993.
U.S. Appl. No. 13/161,508 Office Action dated Apr. 10, 2013.
U.S. Appl. No. 12/683,452 Office Action dated Jun. 7, 2013.
Galor, M., U.S. Appl. No. 13/778,172 "Asymmetric Mapping in Tactile and Non-Tactile User Interfaces" filed Feb. 27, 2013.
Berenson et al., U.S. Appl. No. 13/904,050 "Zoom-based gesture user interface" filed May 29, 2013.
Berenson et al., U.S. Appl. No. 13/904,052 "Gesture-based interface with enhanced features" filed May 29, 2013.
Bychkov et al., U.S. Appl. No. 13/849,514 "Gaze-enhanced Virtual Touchscreen" filed Mar. 24, 2013.
Guendelman et al., U.S. Appl. No. 13/849,514 "Enhanced Virtual Touchpad" filed Mar. 24, 2013.
U.S. Appl. No. 13/244,490 Office Action dated Dec. 6, 2013.
U.S. Appl. No. 13/423,314 Office Action dated Dec. 4, 2013.
U.S. Appl. No. 13/423,322 Office Action dated Nov. 1, 2013.
U.S. Appl. No. 13/314,210 Office Action dated Jul. 19, 2013.
U.S. Appl. No. 13/161,508 Office Action dated Sep. 9, 2013.
International Application PCT/IB2013/052332 Search Report dated Aug. 26, 2013.
U.S. Appl. No. 13/541,786 Office Action dated Feb. 13, 2014.
U.S. Appl. No. 13/584,831 Office Action dated Mar. 20, 2014.

(56) References Cited

OTHER PUBLICATIONS

U.S. Appl. No. 13/423,322 Office Action dated Apr. 7, 2014.
U.S. Appl. No. 12/683,452 Office Action dated Jan. 22, 2014.
U.S. Appl. No. 12/314,210 Office Action dated Jan. 10, 2014.
U.S. Appl. No. 13/592,352 Office Action dated Feb. 13, 2014.
Nakamura et al, "Occlusion detectable stereo-occlusion patterns in camera matrix", Proceedings of the 1996 Conference on Computer Vision and Pattern Recognition (CVPR '96), pp. 371-378, Jun. 1996.
U.S. Appl. No. 13/592,352 Office Action dated May 7, 2014.
U.S. Appl. No. 12/721,582 Office Action dated Apr. 17, 2014.
U.S. Appl. No. 14/055,997 Office Action dated May 28, 2014.
U.S. Appl. No. 13/584,831 Office Action dated Jul. 8, 2014.
U.S. Appl. No. 13/423,314 Office Action dated Jul. 31, 2014.
U.S. Appl. No. 12/683,452 Office Action dated Jul. 16, 2014.
U.S. Appl. No. 13/423,314 Advisory Action dated Jun. 26, 2014.
Slinger et al, "Computer—Generated Holography as a Generic Display Technology", IEEE Computer, vol. 28, Issue 8, pp. 46-53, Aug. 2005.
Hilliges et al, "Interactions in the air: adding further depth to interactive tabletops", Proceedings of the 22nd annual ACM symposium on User interface software and technology, ACM, pp. 139-148, Oct. 2009.

\* cited by examiner

THREE DIMENSIONAL USER INTERFACE CURSOR CONTROL

CROSS-REFERENCE TO RELATED APPLICATIONS

This application claims the benefit of U.S. Provisional Patent Application 61/420,809, filed Dec. 8, 2010, U.S. Provisional Patent Application 61/448,670, filed Mar. 3, 2011, and U.S. Provisional Patent Application 61/538,970, filed Sep. 26, 2011, which are incorporated herein by reference.

FIELD OF THE INVENTION

This invention relates generally to user interfaces for computerized systems, and specifically to user interfaces that are based on three-dimensional sensing.

BACKGROUND OF THE INVENTION

Many different types of user interface devices and methods are currently available. Common tactile interface devices include a computer keyboard, a mouse and a joystick. Touch screens detect the presence and location of a touch by a finger or other object within the display area. Infrared remote controls are widely used, and "wearable" hardware devices have been developed, as well, for purposes of remote control.

Computer interfaces based on three-dimensional (3D) sensing of parts of a user's body have also been proposed. For example, PCT International Publication WO 03/071410, whose disclosure is incorporated herein by reference, describes a gesture recognition system using depth-perceptive sensors. A 3D sensor, typically positioned in a room in proximity to the user, provides position information, which is used to identify gestures created by a body part of interest. The gestures are recognized based on the shape of the body part and its position and orientation over an interval. The gesture is classified for determining an input into a related electronic device.

As another example, U.S. Pat. No. 7,348,963, whose disclosure is incorporated herein by reference, describes an interactive video display system, in which a display screen displays a visual image, and a camera captures 3D information regarding an object in an interactive area located in front of the display screen. A computer system directs the display screen to change the visual image in response to changes in the object.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention a method, including receiving, by a computer executing a non-tactile three dimensional (3D) user interface, a first set of multiple 3D coordinates representing a gesture performed by a user positioned within a field of view of a sensing device coupled to the computer, the first set of 3D coordinates including multiple points in a fixed 3D coordinate system local to the sensing device, and transforming the first set of multiple 3D coordinates to a second set of corresponding multiple 3D coordinates in a subjective 3D coordinate system local to the user.

There is also provided, in accordance with an embodiment of the present invention a method, including receiving, by a computer executing a non-tactile three dimensional (3D) user interface, a set of multiple 3D coordinates representing a gesture performed by a limb of a user positioned within a field of view of a sensing device coupled to the computer, the set of 3D coordinates including first multiple points measured in a fixed 3D coordinate system local to the sensing device, and transforming any of the first multiple points that indicate the limb moving along a depth axis local to the sensing device to corresponding second multiple points along a depth axis local to the user, upon the set of multiple 3D coordinates indicating that a motion of a joint associated with the limb exceeds a specified threshold.

There is alternatively provided, in accordance with an embodiment of the present invention a method, including presenting, by a computer executing a non-tactile three dimensional (3D) user interface, a cursor in proximity to one or more items on a display, receiving a set of multiple 3D coordinates representing a gesture performed by a body part of a user being positioned within a field of view of a sensing device coupled to the computer, calculating a ratio between a first size of the cursor and a second size of the body part, and positioning the cursor responsively to the received set of multiple coordinates in proportion to the calculated ratio.

There is additionally provided, in accordance with an embodiment of the present invention a method, including presenting, by a computer executing a non-tactile three dimensional (3D) user interface, an interactive cursor in proximity to one or more items on a display, receiving a set of multiple 3D coordinates representing a gesture performed by a user positioned within a field of view of a sensing device coupled to the computer, positioning the interactive cursor responsively to the received set of multiple coordinates, and conveying feedback, indicating a proximity of the cursor to the one or more objects.

There is further provided, in accordance with an embodiment of the present invention an apparatus, including a display, and a computer executing a non-tactile three dimensional (3D) user interface, and configured to receive a first set of multiple 3D coordinates representing a gesture performed by a user positioned within a field of view of a sensing device coupled to the computer, the first set of 3D coordinates including multiple points in a fixed 3D coordinate system local to the sensing device, and to transform the first set of multiple 3D coordinates to a second set of corresponding multiple 3D coordinates in a subjective 3D coordinate system local to the user.

There is additionally provided, in accordance with an embodiment of the present invention an apparatus, including a display, and a computer executing a non-tactile three dimensional (3D) user interface, and configured to receive a set of multiple 3D coordinates representing a gesture performed by a limb of a user positioned within a field of view of a sensing device coupled to the computer, the set of 3D coordinates including first multiple points measured in a fixed 3D coordinate system local to the sensing device, and to transform any of the first multiple points that indicate the limb moving along a depth axis local to the sensing device to corresponding second multiple points along a depth axis local to the user, upon the set of multiple 3D coordinates indicating that a motion of a joint associated with the limb exceeds a specified threshold.

There is also provided, in accordance with an embodiment of the present invention an apparatus, including a display, and a computer executing a non-tactile three dimensional (3D) user interface, and configured to present a cursor in proximity to one or more items on the display, to receive a set of multiple 3D coordinates representing a gesture performed by a body part of a user being positioned within a field of view of a sensing device coupled to the computer, to calculate a ratio between a first size of the cursor and a second size of the body part, and to position the cursor responsively to the received set of multiple coordinates in proportion to the calculated ratio.

There is alternatively provided, in accordance with an embodiment of the present invention an apparatus, including a display, and a computer executing a non-tactile three dimensional (3D) user interface, and configured to present an interactive cursor in proximity to one or more items on the display, to receive a set of multiple 3D coordinates representing a gesture performed by a user positioned within a field of view of a sensing device coupled to the computer, to position the interactive cursor responsively to the received set of multiple coordinates, and to convey feedback, indicating a proximity of the cursor to the one or more objects.

There is also provided, in accordance with an embodiment of the present invention a computer software product including a non-transitory computer-readable medium, in which program instructions are stored, which instructions, when read by a computer executing a non-tactile three dimensional user interface, cause the computer to receive a first set of multiple 3D coordinates representing a gesture performed by a user positioned within a field of view of a sensing device coupled to the computer, the first set of 3D coordinates including multiple points in a fixed 3D coordinate system local to the sensing device, and to transform the first set of multiple 3D coordinates to a second set of corresponding multiple 3D coordinates in a subjective 3D coordinate system local to the user.

There is additionally provided, in accordance with an embodiment of the present invention a computer software product including a non-transitory computer-readable medium, in which program instructions are stored, which instructions, when read by a computer executing a non-tactile three dimensional user interface, cause the computer to receive a set of multiple 3D coordinates representing a gesture performed by a limb of a user positioned within a field of view of a sensing device coupled to the computer, the set of 3D coordinates including first multiple points measured in a fixed 3D coordinate system local to the sensing device, and to transform any of the first multiple points that indicate the limb moving along a depth axis local to the sensing device to corresponding second multiple points along a depth axis local to the user, upon the set of multiple 3D coordinates indicating that a motion of a joint associated with the limb exceeds a specified threshold.

There is further provided, in accordance with an embodiment of the present invention a computer software product including a non-transitory computer-readable medium, in which program instructions are stored, which instructions, when read by a computer executing a non-tactile three dimensional user interface, cause the computer to present a cursor in proximity to one or more items on a display, to receive a set of multiple 3D coordinates representing a gesture performed by a body part of a user being positioned within a field of view of a sensing device coupled to the computer, to calculate a ratio between a first size of the cursor and a second size of the body part, and to position the cursor responsively to the received set of multiple coordinates in proportion to the calculated ratio.

There is alternatively provided, in accordance with an embodiment of the present invention a computer software product including a non-transitory computer-readable medium, in which program instructions are stored, which instructions, when read by a computer executing a non-tactile three dimensional user interface, cause the computer to present an interactive cursor in proximity to one or more items on a display, to receive a set of multiple 3D coordinates representing a gesture performed by a user positioned within a field of view of a sensing device coupled to the computer, to position the interactive cursor responsively to the received set of multiple coordinates, and to convey feedback, indicating a proximity of the cursor to the one or more objects.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
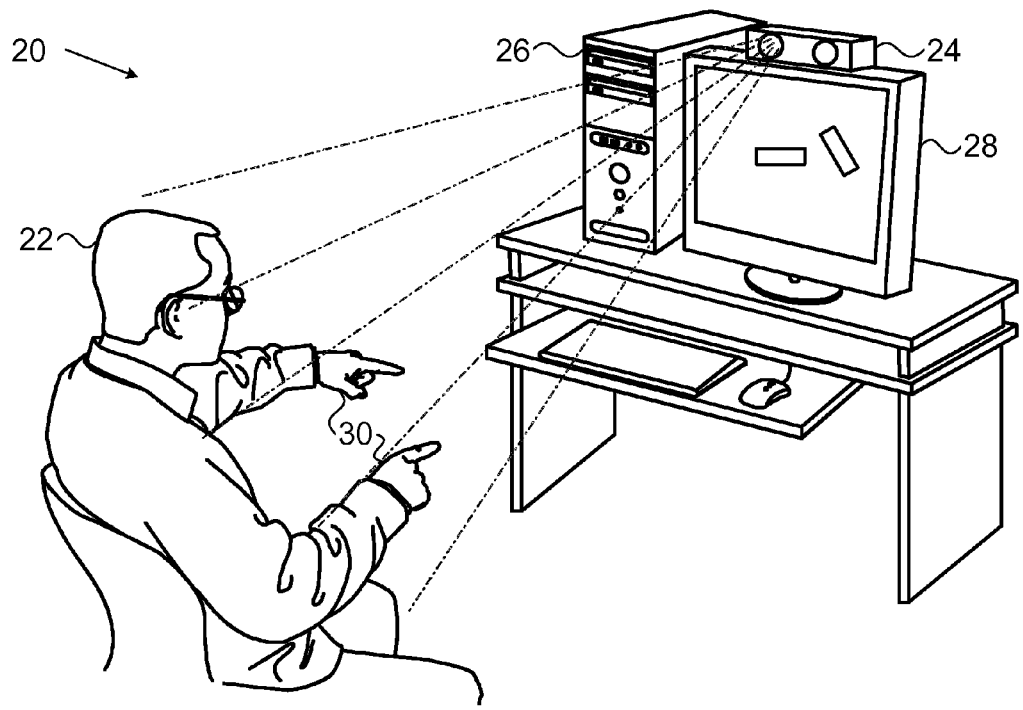
FIG. 1 is a schematic, pictorial illustration of a 3D user interface for a computer system, in accordance with an embodiment of the present invention.

When using a tactile physical input device such as a mouse, a user typically manipulates the physical device in a two-dimensional plane comprising a horizontal X-axis and a vertical Y-axis. However, when interacting with a non-tactile 3D user interface, the user may perform gestures in mid-air, and perform the gestures from different positions within a field of view of a 3D sensor coupled to the interface.

As the user performs a gesture, the 3D sensor conveys, to the non-tactile 3D user interface, a signal indicating a first set of multiple 3D coordinates representing the gesture. Typically, the 3D sensor is stationary and the user may be positioned at different locations and/or orientations (i.e., relative to the 3D sensor) while performing the gesture. The first set of multiple 3D coordinates may be considered to be measured in a first coordinate system local to the 3d sensor. The first coordinate system is typically a fixed coordinate system, with the 3D sensor defining an origin for a horizontal axis, a vertical axis and a depth axis.

Depending on the user's position relative to the 3D sensor, axes of a subjective coordinate system, as perceived by the user, may not align with the axes of the fixed coordinate system. Therefore, it may be difficult to identify a performed gesture from the coordinates measured by the 3D sensor. For example, the user may perform a "wave" gesture, by moving a hand along the subjective coordinate system's horizontal axis. However, the 3D sensor's measured coordinates may indicate movement along the horizontal axis and the depth axis of the sensor's fixed coordinate system, if the two sets of axes are misaligned.

Embodiments of the present invention provide methods and systems for transforming between a first fixed coordinate system of a 3D sensor coupled to a computer and a second subjective coordinate system local to the user. Since the user may perform gestures from different positions, the subjective coordinate system is typically a "moving" or variable coordinate system, with the user defining an origin for a horizontal axis, a vertical axis and a depth axis. Typically, the origin and the directions of the horizontal, the vertical and the depth axes of the moving coordinate system may change, as the user changes position within the 3D sensor's field of view.

In some embodiments, the transformation is based on a position (i.e., location and orientation) of the user relative to the 3D sensor. Additionally or alternatively, the transformation may allow for the position of the 3D sensor in relation to room parameters (e.g., the 3D sensor may be positioned at an angle not parallel to the room's floor). Using embodiments of the present invention described herein, the non-tactile 3D user interface can simulate the second coordinate system local to the user, and therefore interpret user gestures with greater accuracy.

While interacting with traditional two-dimensional (2D) user interfaces, the physical devices described supra typically convey tactile feedback to the user. However, while interacting with a 3D user interface, the user may perform gestures without engaging any physical device, and therefore not receive any tactile feedback. Embodiments of the present invention provide methods and systems for conveying visual and/or audio feedback to the user, thereby compensating for the lack of tactile feedback.

Coordinate transformations described herein can be used by the non-tactile 3D user Interface when presenting and positioning user interface elements on a display such as a cursor (as described in detail hereinbelow), a ZoomGrid control scheme, a joystick user interface, a horizontal bar user interface, and a sessionless pointing user interface. The ZoomGrid control scheme is described in U.S. Provisional Patent Application 61/521,448, filed Aug. 9, 2011, which is incorporated herein by reference. The joystick user interface and the horizontal bar user interface are described in U.S. patent application Ser. No. 13/161,508, filed Jun. 16, 2011, which is incorporated herein by reference. The sessionless pointing user interface is described in U.S. Provisional Patent Application 61/526,692, filed Aug. 24, 2011, which is incorporated herein by reference.

System Description

FIG. 1 is a schematic, pictorial illustration of a non-tactile 3D user interface 20 (also referred to herein as the user interface) for operation by a user 22 of a computer 26, in accordance with an embodiment of the present invention. The non-tactile 3D user interface is based on a 3D sensing device 24 coupled to the computer, which captures 3D scene information of a scene that includes the body (or at least a body part, such as hands 30) of the user. Device 24 or a separate camera (not shown in the figures) may also capture video images of the scene. The information captured by device 24 is processed by computer 26, which drives a display 28 accordingly.

Computer 26, executing 3D user interface 20, processes data generated by device 24 in order to reconstruct a 3D map of user 22. The term "3D map" refers to a set of 3D coordinates measured with reference to a fixed set of axes in space based on device 24. The 3D coordinates represent the surface of a given object, in this case the user's body. In one embodiment, device 24 projects a pattern of spots onto the object and captures an image of the projected pattern. Computer 26 then computes the 3D coordinates of points on the surface of the user's body by triangulation, based on transverse shifts of the spots in the pattern. Methods and devices for this sort of triangulation-based 3D mapping using a projected pattern are described, for example, in PCT International Publications WO 2007/043036, WO 2007/105205 and WO 2008/120217, whose disclosures are incorporated herein by reference. Alternatively, interface 20 may use other methods of 3D mapping, using single or multiple cameras or other types of sensors, as are known in the art.

Computer 26 typically comprises a general-purpose computer processor, which is programmed in software to carry out the functions described hereinbelow. The software may be downloaded to the processor in electronic form, over a network, for example, or it may alternatively be provided on tangible media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although computer 26 is shown in FIG. 1, by way of example, as a separate unit from sensing device 24, some or all of the processing functions of the computer may be performed by suitable dedicated circuitry within the housing of the sensing device or otherwise associated with the sensing device.

As another alternative, these processing functions may be carried out by a suitable processor that is integrated with display 28 (in a television set, for example) or with any other suitable sort of computerized device, such as a game console or media player. The sensing functions of device 24 may likewise be integrated into the computer or other computerized apparatus that is to be controlled by the sensor output.

Subjective Coordinate Transformation

As user 22 performs physical gestures, embodiments of the present invention combine the methods described hereinbelow to transform a first set of coordinates in a fixed coordinate system (local to sensing device 24) to a second set of coordinates in a subjective coordinate system (local to user 22). The first set of coordinates is based on signals received from 3D sensing device 24 while user 22 performs the gesture. In embodiments of the invention described herein, the fixed coordinate system comprises a generally horizontal X-axis, a generally vertical Y-axis and a depth Z-axis, the X, Y and Z axes being mutually orthogonal Cartesian axes in space, typically with an origin at device 24.

The subjective coordinate system may comprise a generally horizontal X'-axis, a generally vertical Y'-axis and a depth Z'-axis, the axes also being mutually orthogonal Cartesian axes, and having an origin in the vicinity of the user. In some embodiments, the subjective coordinate system may use coordinate systems other than those with Cartesian axes, such as spherical or cylindrical coordinate systems.

Figure 2:
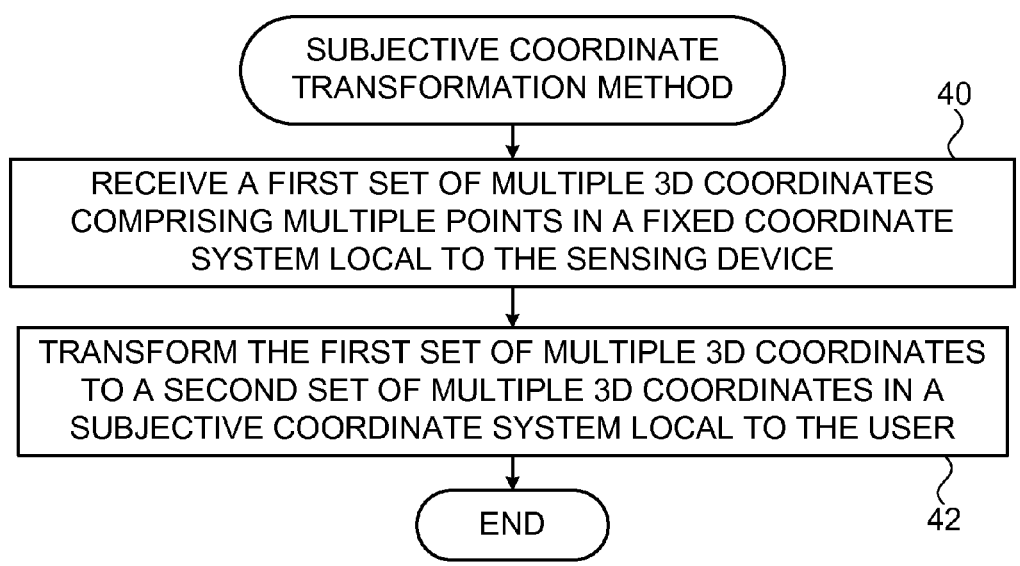
FIG. 2 is a flow diagram that schematically illustrates a method for subjective coordinate transformation, in accordance with an embodiment of the present invention.

FIG. 2 is a flow diagram that schematically illustrates a method for subjective coordinate transformation, in accordance with an embodiment of the present invention. In a receive step 40, computer 26 receives a first set of multiple 3D coordinates representing a gesture performed by user 22. The received multiple 3D coordinates typically comprise multiple points in the fixed coordinate system local to sensing device 24. In a transformation step 42, computer 26 transforms the received set of 3D coordinates to a second set of multiple 3D coordinates in the subjective coordinate system local to user 22.

The coordinate transformations described hereinbelow enable computer 26 to interpret the gestures with greater accuracy. The transformations can help compensate for differences in the physical positioning of 3D sensing device 24, and for differences in the location and orientation of user 22 relative to the 3D sensing device. The coordinate transformations utilized by computer 26 that are described hereinbelow include:
  Vertical tilt (vertical axis) correction.
  Horizontal angle (horizontal axis) correction.
  Spherical deformation.
  Identifying a gesture when the dominant motion is along the depth axis.
  Automatic learning.
  Manual calibration.

Additional coordinate transformations that can be utilized by computer 26 in embodiments of the present invention include but are not limited to a parabolic transformation, an elliptic transformation, a Gaussian transformation, a multi-section planar transformation, a spline transformation and a nurbs transformation.

Figure 3:
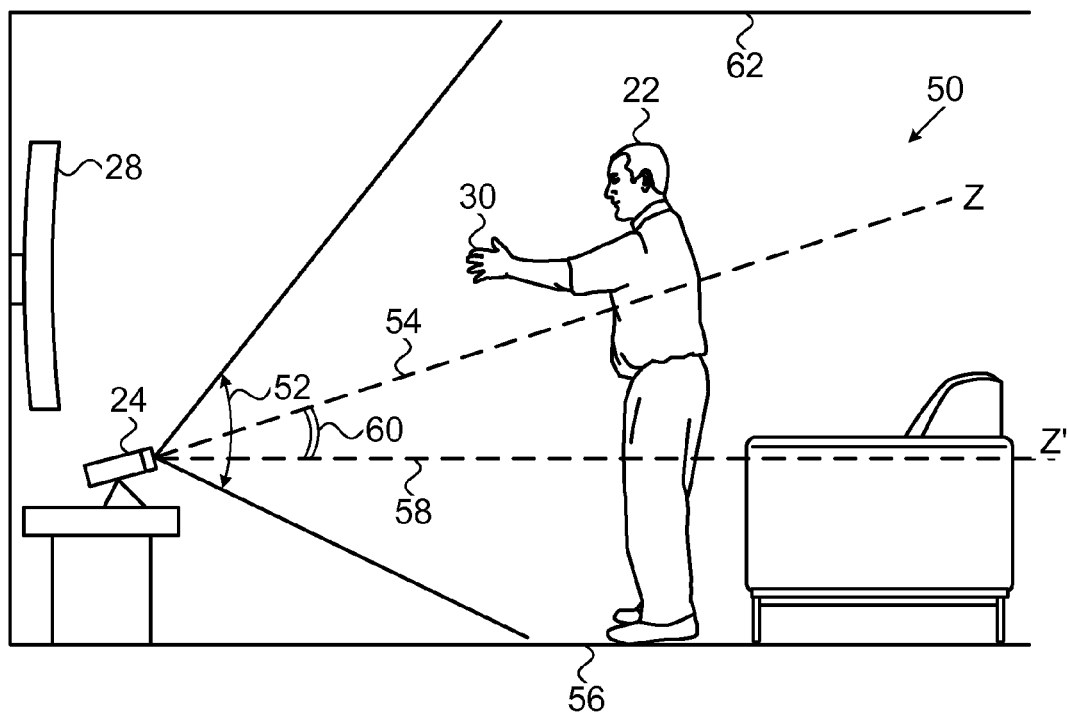
FIG. 3 is a schematic side view illustration of a user standing in a room and interacting with the non-tactile 3D user interface via a 3D sensing device, in accordance with an embodiment of the present invention.

FIG. 3 is a schematic side view illustration of user 22 positioned (in this case standing) in a room 50 and interacting with user interface 20, in accordance with an embodiment of the present invention. In the configuration shown in FIG. 2, 3D sensing device 24 is positioned below display 28, and has a vertical field of view 52. Additionally, 3D sensing device 24 is tilted slightly upward, resulting in a Z-axis 54 that is not parallel to a floor 56. Alternatively, 3D sensing device 24 may be positioned above display 28 and tilted downward.

While positioned within field of view 52 and interacting with user interface 20, the subjective coordinate system comprises a Z'-axis 58 that is assumed to be substantially parallel to floor 56. Embodiments of the present invention determine a vertical tilt, which comprises a vertical angle 60 between Z-axis 54 and Z'-axis 58.

In some embodiments (i.e., in transformation step 42), computer 26 determines vertical angle 60 based on vertical reference data collected during a pre-calibration step. For example, computer 26 may track and analyze a pose of user 22, and use the pose as a vertical reference. Additionally or alternatively, computer 26 may use surfaces in room 50, such as floor 56, a ceiling 62 and a wall (not shown) as references. Further alternatively, 3D sensing device 24 may include an accelerometer configured to detect vertical angle 60, and convey a signal indicating the vertical angle to computer 26. Upon determining vertical angle 60, computer 26 can store the vertical angle to a calibration matrix, which can be used to transform coordinates on Z-axis 54 to coordinates on Z'-axis 58.

Figure 4:
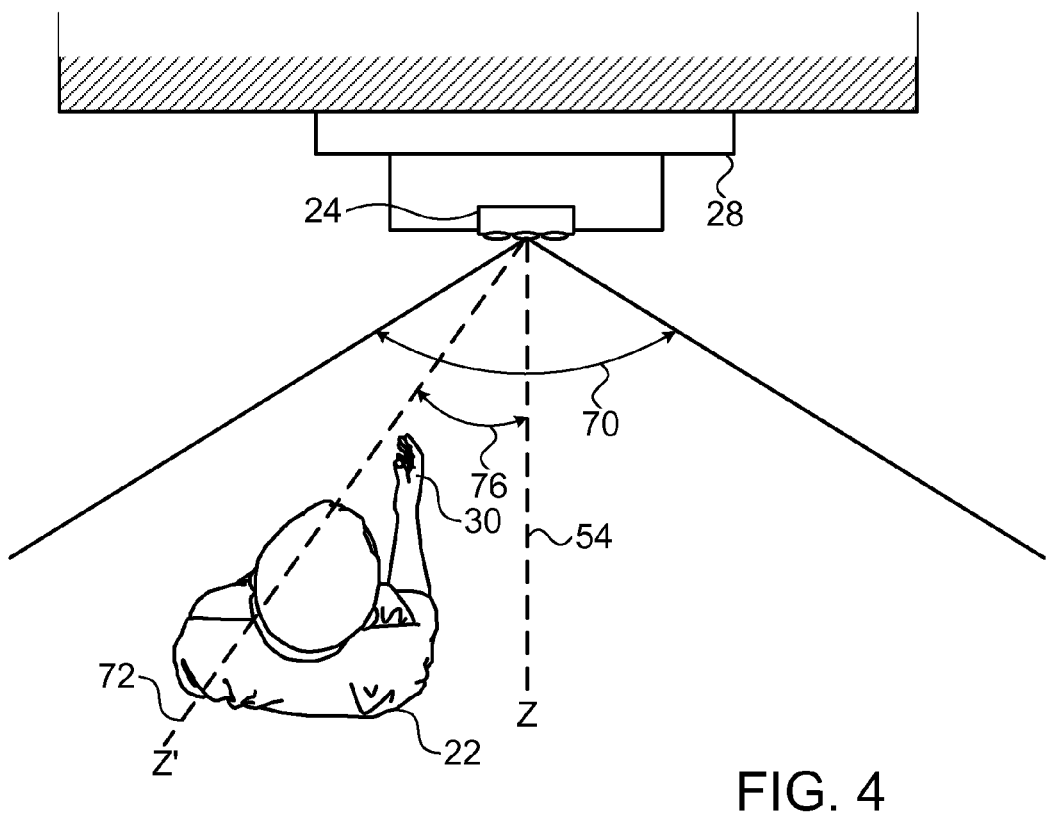
FIG. 4 is a schematic top-down view illustration of the user interacting with the non-tactile 3D user interface, in accordance with an embodiment of the present invention.

FIG. 4 is a schematic top view of user 22 interacting with 3D user interface 20, in accordance with an embodiment of the present invention. In the configuration shown in FIG. 4, user 22 is standing off to the side of display 28 and 3D sensing device 24, but within a horizontal field of view 70. Since user 22 is not standing directly in front of 3D sensing device 24, the subjective coordinate system may use a Z'-axis 72, comprising a line between the user and device 24, while the fixed coordinate system may use Z-axis 54, defined, as explained above, by the position of device 24.

If 3D sensing device 24 and display 28 are substantially aligned horizontally, and horizontal field of view 70 is known, then computer 26 can determine a horizontal angle 76 between Z'-axis 72 and Z-axis 54, by methods generally similar to those described with reference to FIG. 3. Computer 26 can store horizontal angle 76 to the calibration matrix, thereby enabling the user interface to transform coordinates measured with respect to Z-axis 54 to coordinates measured with respect to Z'-axis 72.

The description above illustrates that, in general, values of vertical angle 60 and horizontal angle 76 enable transformation between the fixed depth axis defined with respect to device 24 and the subjective depth axis defined with respect to user 22.

Figure 5:
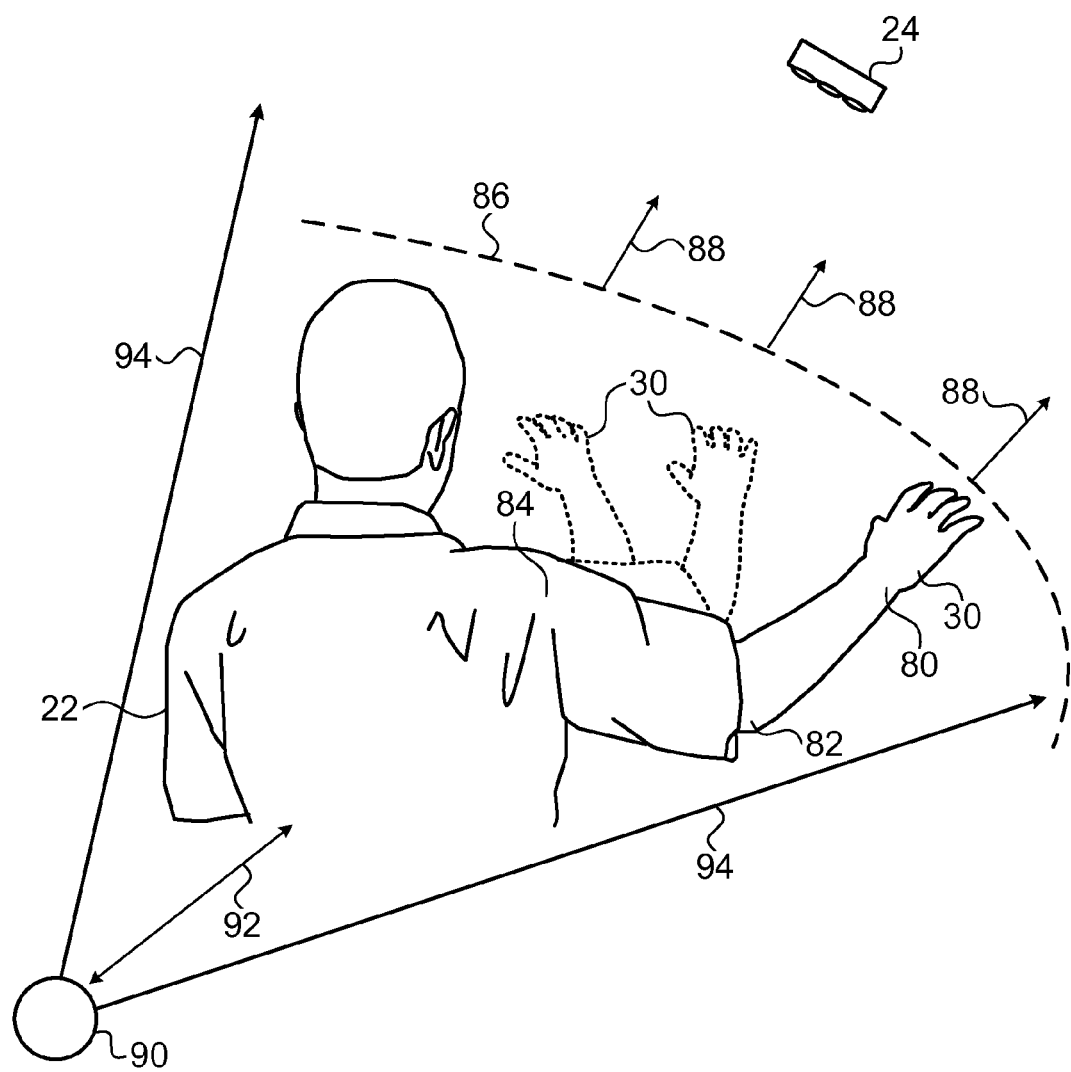
FIG. 5 is a schematic pictorial illustration of the user performing a gesture comprising spherical coordinates, in accordance with an embodiment of the present invention.

FIG. 5 is a schematic pictorial illustration of user 22 performing a gesture, which may be conveniently defined as a series of spherical coordinates, in accordance with an embodiment of the present invention. Since user 22 does not interact tangibly with a physical surface of the user interface, the gesture may be more efficiently analyzed using a subjective spherical coordinate system local to the user.

As user 22 performs gestures with hand 30, the actual motion of the hand is typically influenced by various joints in the user's body, including wrist 80, elbow 82 and shoulder 84. For example, while a wave gesture may be defined as moving hand back and forth horizontally (i.e., side-to-side), the hand may actually move along an arc 86 due to a rotation of the joints. Likewise, while performing a push focus gesture or a touch gesture (described in further detail hereinbelow), where hand 30 moves forward and backward relative to user 22, the direction of the forward and the backward motion may depend on the location and orientation of the user (i.e., relative to sensing device 24), and the location of hand 30 along arc 86. The forward and backward motion is typically substantially perpendicular to arc 86, as indicated by arrows 88. The push focus gesture and the wave gesture are described in U.S. Provisional Patent Application 61/422,239, filed on Dec. 13, 2010, which is incorporated herein by reference.

While the example in FIG. 5 shows user 22 performing a horizontal Find gesture (i.e., by moving hand 30 from either left to right or right to left), the user may also perform the Find gesture by moving the hand in a vertical (i.e., up or down) or in a diagonal direction. Therefore, arc 86 may comprise an arc along a horizontal plane (as shown in FIG. 5), a vertical plane, or a diagonal plane.

As user 22 performs a gesture, embodiments of the present invention enable computer 26 to transform a first set of Cartesian coordinates received from sensing device 24 to a second set of spherical coordinates in a subjective spherical coordinate system local to user 22. Transforming the Cartesian coordinates to the spherical coordinates is referred to herein as a spherical deformation.

In some embodiments, the spherical deformation typically involves computer 26 measuring spherical coordinates along a non-linear arc 86 with respect to a reference point 90, where the reference point comprises a center of arc 86, in proximity to user 22. In some embodiments, since reference point 90 comprises the center of arc 86, coordinates on the arc may be assumed to be substantially equidistant from the reference point.

In additional embodiments, computer 26 may select reference point 90 based on the user's physical dimensions and current pose (e.g., standing, sitting or leaning back), since the location of reference point 90 may depend on the particular body joint performing the majority of the motion during a gesture. For example, if user 22 is standing, computer 26 may set reference point 90 to be a location corresponding to shoulder 84. Alternatively, computer 26 may set reference point 90 to be a location corresponding to elbow 82 when the user is sitting. Additionally, computer 26 may adjust the distance that hand 30 needs to move while performing a gesture based on the user's current pose. For example, while performing a side-to-side wave gesture, user 22 may move hand 30 a greater distance when standing than when sitting.

In alternative embodiments, upon user 22 performing a push focus gesture, computer 26 may select reference point 90 as a specific distance 92 (typically between 50 and 70 centimeters) behind the user. After selecting reference point 90, computer can calculate a radius 94 as a distance measured between reference point 90 and a location where user 22 extended hand 30 while performing the push focus gesture.

In further embodiments, computer 26 may store parameters such as reference point 90 and radius 94 as spherical deformation parameters for a spherical function configured to transform the first set of Cartesian coordinates to the second set of spherical coordinates.

Figure 6:
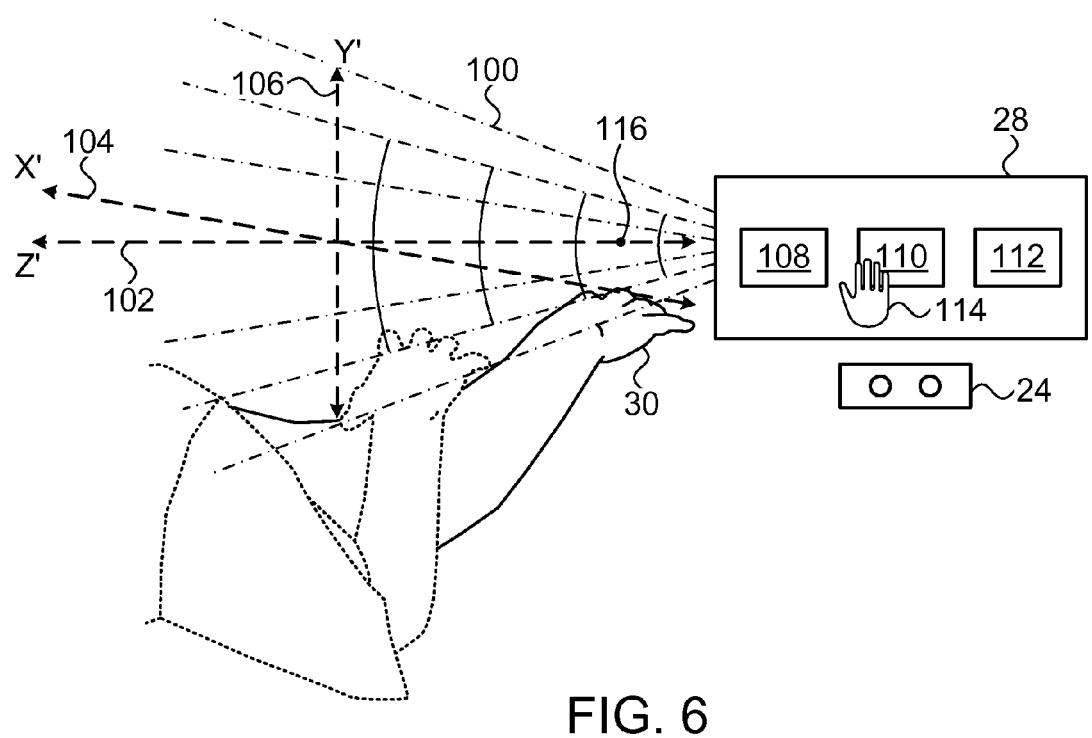
FIG. 6 is a schematic pictorial illustration of an X'-Y' plane that converges as the user extends a hand closer to the 3D sensing device, in accordance with an embodiment of the present invention.

FIG. 6 is a schematic pictorial illustration of hand 30 moving forward and backward along a depth Z'-axis 102 local to the user, in accordance with an embodiment of the present invention. Although user 22 may intend to move hand 30 solely along Z'-axis 102, the user may also unintentionally move the hand in an X'-Y' plane 100, which comprises a horizontal X'-axis 104 and a vertical Y'-axis 106. X'-Y' plane 100, X'-axis 104 and Y'-axis 106 are also local to user 22.

To interact with user interface 20, user 22 typically performs gestures by moving hand 30 along X'-Y' plane 10 and Z'-axis 102. While interacting with user interface 20, user 22 may manipulate items 108, 110 and 112 that computer 26 presents on screen 28. In some embodiments, items 108, 110 and 112 may comprise icons and buttons similar to those found on traditional two dimensional (2D) user interfaces. Examples of gestures performed by user 22 include:

A "Find" gesture comprises moving hand 30 along X'-Y' plane 100 in order to highlight, using a cursor 114, item 110. In the example shown in FIG. 5, in response to the Find gesture computer 26 highlights item 110 by presenting a shadow around item 110.

A "Touch" gesture comprises moving hand 30 forward along Z'-axis 102, thereby selecting item 110.

In operation, user 22 typically manipulates cursor 114 by moving hand 30 along an X'-Y' plane 100 until the cursor passes over and highlights item 110. The manipulation corresponds to the Find gesture described above. Once computer 26 highlights item 110, user 22 can move hand 30 forward along Z'-axis 102 to a reference touch point 116, thereby "touching" (i.e., selecting) the highlighted item. However, while moving hand 30 along Z'-axis 102, user 22 may also unintentionally move hand 30 along X'-Y' plane 100.

As shown in FIG. 6, computer 26 "converges" X'-Y' plane 100 by reducing the impact of any motion detected in the X'-Y' plane, once the dominant component of the motion (i.e., of hand 30) is along Z'-axis 102. In other words, as hand 30 transitions from the Find gesture to the Touch gesture, computer assigns less significance to any motion along X'-Y' plane 100.

When user 22 performs a Find gesture followed by a Touch gesture, computer 26 may detect a slight pause as hand 30 changes direction (i.e., from a side-to-side motion to a forward and backward motion). In some embodiments, computer 26 may assign less significance to any motion in X'-Y' plane 100, upon detecting a slight pause between motion primarily in X'-Y' plane 100 and motion primarily along Z'-axis 102. Additionally, computer 26 may reposition reference touch point 116 to a specific distance from a location where hand 30 transitioned from the Find gesture to the Touch gesture.

In some embodiments, computer 26 may employ an automatic learning algorithm to personalize user interface 20 to user 22. By continually observing the motion of hand 30, computer 26 can employ the automatic learning algorithm to estimate 3D coordinates of the gestures with greater accuracy. Additionally, since the majority of the hand-motion is typically in X'-Y' plane 100, the learning algorithm can employ statistical methods to estimate any coordinate rotation along the X'-Y' plane.

For example, when user 22 performs a push focus gesture, the automatic learning algorithm can calibrate computer 26 to the user's local Z'-axis based on the direction of the push focus gesture. Additionally or alternatively, if user 22 performs a wave gesture, then the automatic learning algorithm can calibrate computer 26 to the user's local X'-axis.

In further embodiments, computer 26 may prompt user 22 to perform specific gestures that manually calibrate the user interface to the user's local X'-axis, Y'-axis and Z'-axis. Examples of manual calibration operations include Raising hand 30. By moving hand 30 in an up-and-down motion, computer 26 can calibrate the Y'-axis for user 22.

Four corner pushes. By moving hand 30, user 22 can first position cursor 114 at each "corner" of display 28 and then perform a push focus gesture. Each of the push focus gestures provides computer 26 with a separate Z'-axis local to its respective corner. Computer 26 can then employ a compensation algorithm that interpolates a Z'-axis direction estimation for each coordinate on display 28 corresponding to a location of hand 30 within the four "corners".

Rectangle gesture. By moving hand 30, user 22 can position cursor 114 to "draw" a work surface rectangle on display 28, thereby aligning X'-Y' plane 100 to the plane of the rectangle drawn by the user.

Circle gesture. When user 22 performs a circle gesture, computer 26 can align X'-Y' plane 100 to the plane of the circle drawn by the user.

Virtual surface rubbing. When user 22 performs a "rubbing" gesture, computer 26 can define a work surface, by optimizing its geometry to process coordinates collected during the motion. During the "rubbing," computer 26 can collect multiple coordinates of hand 30 during a defined period. Using the collected coordinates, computer 26 can optimize the parameters of a linear surface that best fits the collected coordinates, thereby aligning X'-Y' plane 100 to the plane of the surface "rubbed" by user 22.

As discussed supra, computer 26 employs vertical axis coordinate transformations, horizontal axis coordinate transformations, spherical coordinate transformations, and X'-Y' plane 100 convergence in order to transform a first set of 3D coordinates in a fixed 3D coordinate system local to sensing device 24 to a second set of corresponding multiple 3D coordinates in a subjective 3D coordinate system local to the user. In operation, computer 26 may utilize one or more of the transformations described hereinabove.

In some embodiments computer 26 may execute the aforementioned transformations sequentially as follows:

Sensing device 24 conveys a signal to computer 26 indicating multiple 3D coordinates representing a gesture performed by user 22, where the first set of 3D coordinates comprising multiple points in a fixed 3D coordinate system local to sensing device 24.

Computer 26 performs a vertical axis transformation by applying the calibration matrix to transform the coordinates from Z-axis 54 to coordinates on Z'-axis 58.

Computer 26 performs a horizontal axis transformation by applying the calibration matrix to transform the coordinates from Z-axis 54 to coordinates on Z'-axis 72.

Computer 26 transforms the first set of Cartesian coordinates received from sensing device 24 to a second set of spherical coordinates in the subjective spherical coordinate system local to user 22.

Computer 26 assigns less significance to any motion along X'-Y' plane 100, upon determining that the dominant component of the motion (i.e., of hand 30) is along Z'-axis 102.

While performing the Find gesture, user 22 may unintentionally move hand 30 along the depth Z'-axis local to the user. For example, if the user is sitting on a chair, rests an elbow on the chair's armrest, and performs an up-and-down Find gesture, the hand will typically move along arc 86 (that includes local Z-axis coordinates) due to a rotation of the elbow joint.

In some embodiments, computer 26 performs a subjective Z-axis coordinate transformation by differentiating between intentional and unintentional motion of the hand 30 along the depth Z'-axis local to the user by using associated elbow 82 (i.e., the right elbow when moving the right hand, and the left elbow when moving the left hand) of the user as a reference when determining the significance of the hand's motion on the local Z'-axis.

For example, if user 22 keeps elbow 82 relatively stationary while performing a Find gesture, then computer 26 may assign less significance to the hand's motion detected on the local Z'-axis. However, if user 22 moves elbow 82 while performing the Touch gesture, then computer 26 may assign greater significance to the hand's motion detected on the local Z'-axis. In other words, if user 22 raises elbow 82 while moving hand 30 forward, then embodiments of the present invention can assume that the user is intentionally moving the hand forward along the local Z'-axis.

Figure 7:
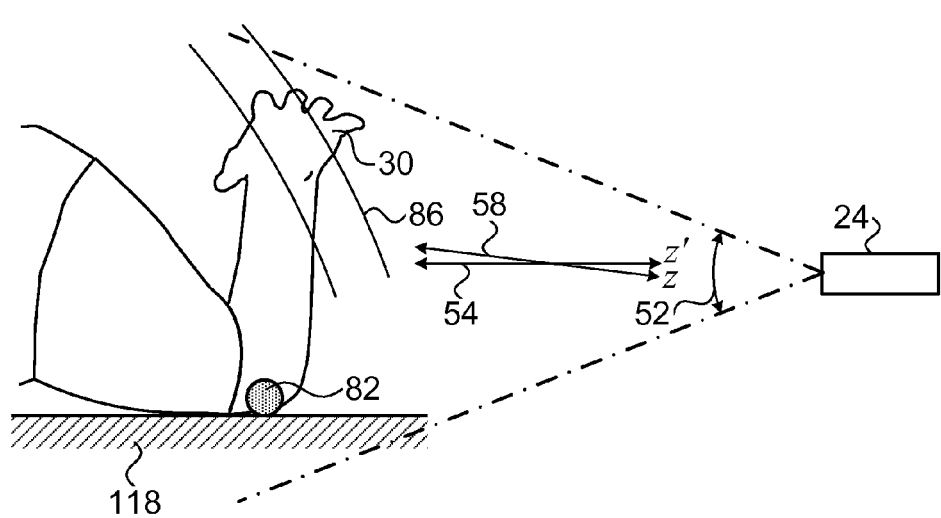
FIG. 7 is a schematic side view illustration of a hand performing a Find gesture by pivoting the hand around an associated stationary elbow, in accordance with an embodiment of the present invention.

FIG. 7 is a schematic side view illustration of hand 30 performing a Find gesture, in accordance with an embodiment of the present invention. In the example shown in FIG. 7, user performs the Find gesture by pivoting hand 30 around associated elbow 82, which is resting (i.e., stationary) on a surface 118. As user 22 moves hand 30 along arc 86 and within field of view 52 of 3D sensing device 24, computer 26 receives a first signal from the 3D sensing device indicating a first set of multiple 3D coordinates representing the Find gesture, where the first set of 3D coordinates comprises multiple points measured relative to device 24.

While hand 30 performs a Find gesture, computer 26 receives a signal from 3D sensing device 24 indicating a motion performed by hand 30 and its associated elbow 82, where the signal comprises a multiple 3D coordinates indicating first multiple points in the subjective coordinate system. If the received multiple 3D coordinates indicate movement of elbow 82 along Z'-axis 58 to be within a specified threshold (e.g., two centimeters) while hand 30 moves along arc 86, then the computer may assign less significance to the hand's motion along Z'-axis 58. In other words, as user 22 performs a Find gesture (i.e., and the motion of elbow 82 is within the specified threshold), computer 26 may not transform the first multiple points in the first set of 3D coordinates indicating hand 30 moving along Z-axis 54 to corresponding second multiple points on Z'-axis 58.

Figure 8:
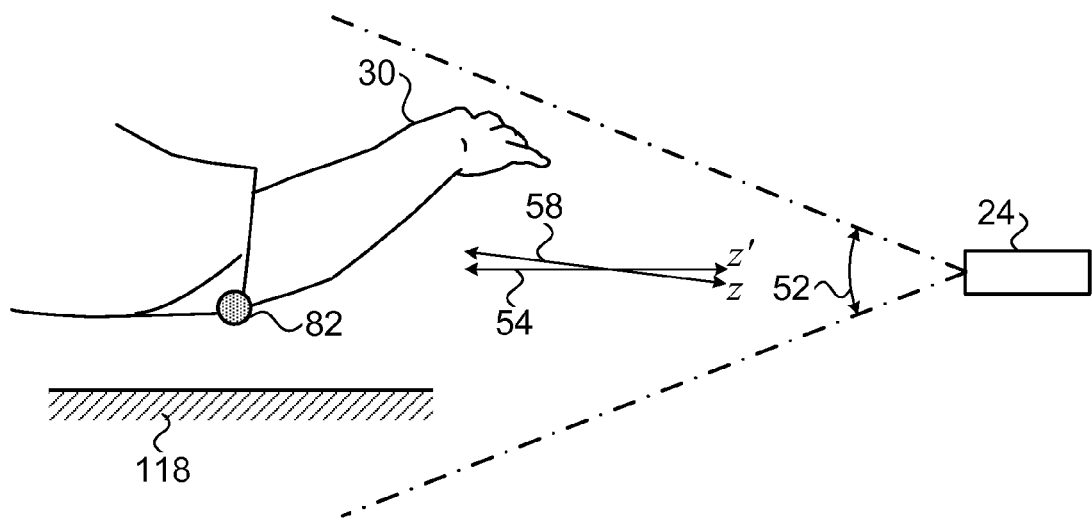
FIG. 8 is a schematic side view illustration of the hand performing a Touch gesture while moving the associated elbow, in accordance with an embodiment of the present invention.

FIG. 8 is a schematic side view illustration of hand 30 performing a Touch gesture while moving associated elbow 82, in accordance with an embodiment of the present invention. As user moves hand 30 forward along Z'-axis 58 and within field of view 52, computer 26 receives the first signal from the 3D sensing device indicating the first set of multiple 3D coordinates representing the Touch gesture, where the first set of multiple 3D coordinates comprises multiple points on Z-axis 54.

While hand 30 performs a Touch gesture, computer 26 receives a signal from 3D sensing device 24 indicating a motion performed by hand 30 and its associated elbow 82, where the signal comprises multiple 3D coordinates indicating first multiple points in the subjective coordinate system. If the received multiple 3D coordinates indicate movement of elbow 82 along Z'-axis 58 to be greater than the specified threshold while hand 30 moves along arc 86, then the computer may assign greater significance to the hand's motion along Z'-axis 58. In other words, as user 22 performs a Touch gesture (i.e., and the motion of elbow 82 is greater the specified threshold), computer 26 may transform the first multiple points in the first set of 3D coordinates indicating hand 30 moving along Z-axis 54 to corresponding second multiple points on Z'-axis 58.

Although the examples shown in FIG. 8 show user 30 moving hand 30 and elbow 82 while performing the Find gesture, alternative gestures using different limb and joint combinations are considered to be within the spirit and scope of the present invention. For example, computer 26 can differentiate between intentional and unintentional motion of the user's foot (not shown) along the subjective Z'-axis to the user by using the user's knee (not shown) as a reference when determining the significance of the foot's motion on the local Z'-axis.

Cursor Visualization

Although user 22 may perform three-dimensional gestures while interacting with user interface 20, visual feedback is typically presented in two dimensions on display 28. Conveying effective visual and/or audio feedback to user 22 enhances the ability of the user to interact with user interface 20. Embodiments of the present invention described hereinbelow present various cursor configurations on display 28 that convey visual feedback to user 22. In some embodiments, computer 26 may convey audio feedback to user 22 while the user interacts with the user interface.

As described supra, computer 26 receives signals from 3D sensing device 24 indicating a first set of coordinates representing a gesture performed by user 22, using hand 30. Upon receiving the first set of coordinates, which are in a fixed coordinate system local to sensing device 24, computer 26 may then transform the received coordinates to a second set of coordinates that are in a moving coordinate system local to user 22. Embodiments of the present invention convey feedback indicating the hand's proximity to reference touch point 116 along depth Z'-axis 102 in the coordinate system local to user (FIG. 6). Since the user interface is three dimensional, interacting with items presented on display 28 typically comprises hand 30 moving on Z'-axis 102 (e.g., the Touch gesture discussed supra).

Figure 9:
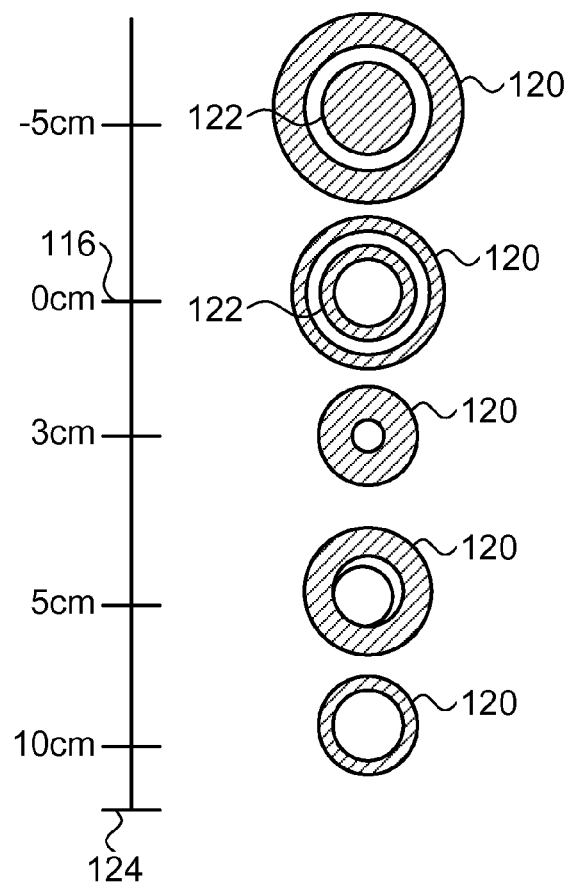
FIG. 9 is a schematic pictorial illustration showing shapes of a ring cursor presented on a display, in accordance with an embodiment of the present invention.

FIG. 9 is a schematic pictorial illustration showing various configurations of a ring cursor 120 presented on display 28, in accordance with an embodiment of the present invention. Ring cursor 120 conveys visual feedback to user 22 as to a position of hand 30 on Z'-axis 102 relative to reference touch point 116. A scale 124 indicates the distance between hand 30 and reference touch point 116. As user 22 moves hand 30 towards reference touch point 116 along Z'-axis 102, computer 26 may proportionally fill in ring 120, making the ring thicker until completely filling in the ring at the point where the hand reaches the reference touch point.

Upon hand 30 reaching reference touch point 116, computer may present a visual effect, such as flashing different colors within ring cursor 120, thereby enabling user 22 to realize that the hand has reached the reference touch point. Likewise, as user 22 retracts hand 30 back away from reference touch point 116, computer 26 may gray out the ring cursor.

In some embodiments, computer 26 may change the configuration of ring cursor 120 as user 22 extends hand 30 beyond reference touch point 116. In the configuration shown in FIG. 9, computer 26 adds a second inner ring 122 to the ring cursor, upon hand 30 reaching reference touch point 116. If user 30 extends hand 30 beyond reference touch point 116 (e.g., −5 centimeters on scale 124), the user interface may change the size of inner ring 122.

Figure 10:
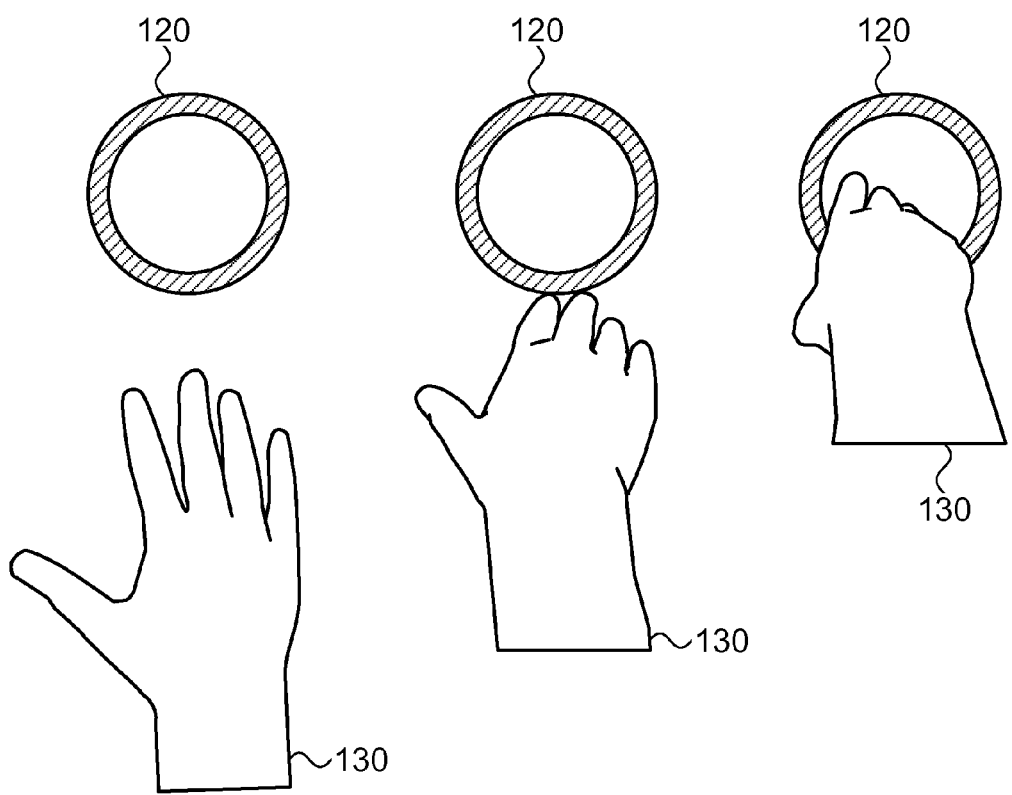
FIG. 10 is a schematic pictorial illustration showing hand shadows presented in proximity to the ring cursor, in accordance with an embodiment of the present invention.

FIG. 10 is a schematic pictorial illustration showing a hand shadow or icon 130 displayed in proximity to ring cursor 120, in accordance with an embodiment of the present invention. The proximity of shadow 130 to ring cursor 120 may depend on the proximity of hand 30 to reference touch point 116. Additionally, as hand 30 reaches reference touch point 116 on Z'-axis 102, computer 26 may simulate the hand pressing a button by presenting fingers in shadow 130 being slightly bent back.

Figure 11:
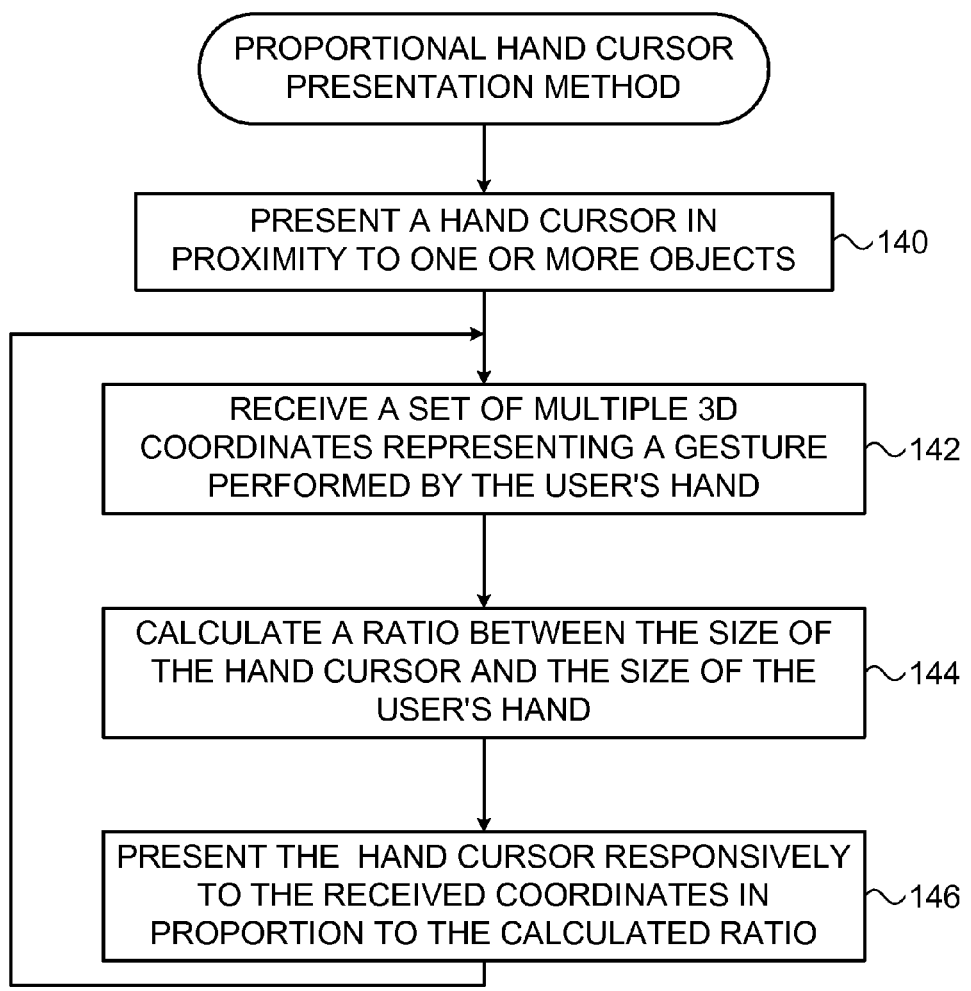
FIG. 11 is a flow diagram that schematically illustrates a method for presenting a proportional hand cursor, in accordance with an embodiment of the present invention.
Figure 12:
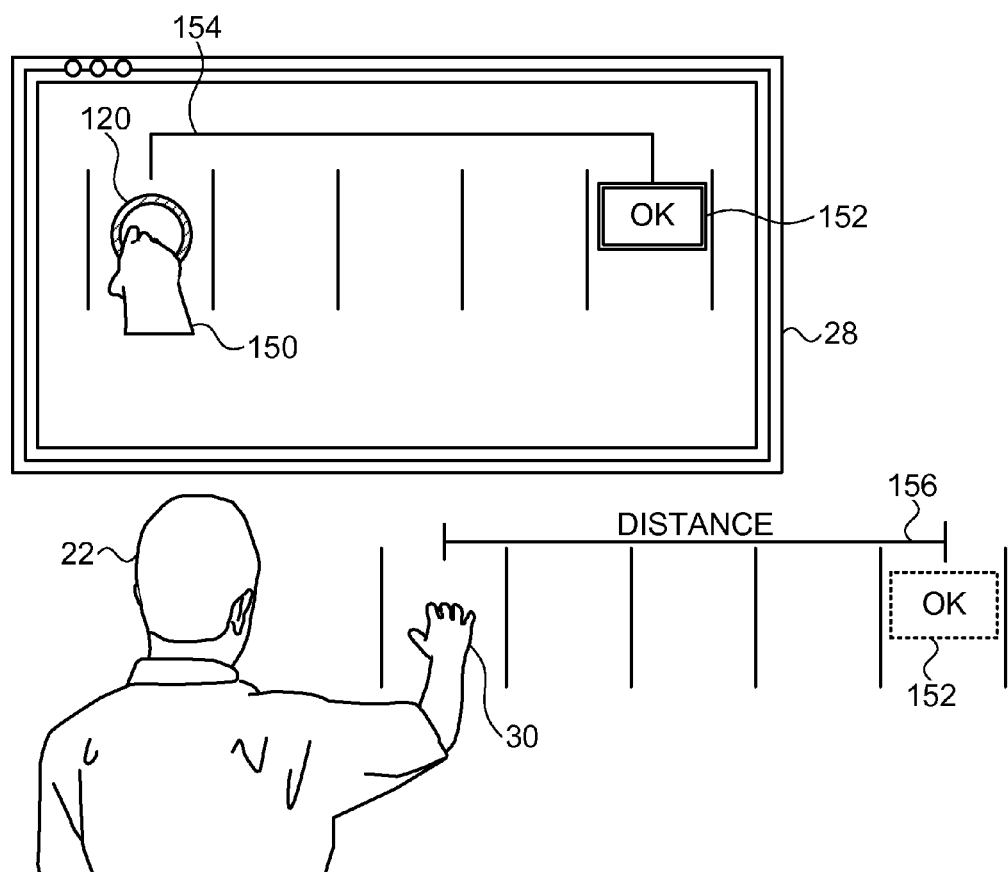
FIG. 12 is a schematic pictorial illustration of the non-tactile 3D user interface implementing the proportional hand cursor, in accordance with an embodiment of the present invention.

FIG. 11 is a flow diagram that schematically illustrates a method for presenting a proportional hand cursor 150, in accordance with an embodiment of the present invention, and FIG. 12 is a schematic pictorial illustration of user interface 20 implementing the proportional hand cursor, in accordance with an embodiment of the present invention. In some embodiments, computer 26 may present hand cursor 150 as proportional to the size of hand 30 as measured by device 24. Implementing proportional cursor 150 can help user 22 acclimate to the non-tactile 3D user interface, since computer 26 can present the motion of hand cursor 150 as proportional to the motion of hand 30.

In a presentation step 140, computer 26 presents hand cursor 150 on display 28, where the hand cursor is in proximity to one or more items (e.g., icons) also presented on the display. In a receive step 142, computer 26 receives a set of multiple 3D coordinates representing a gesture that user 22 performs using hand 30, and in a calculation step 144, the computer calculates a ratio between the size of hand cursor 150 and the measured size of the hand. In a presentation step 146, computer 26 positions hand cursor responsively to the received coordinates in proportion to the calculated ratio, and the method continues with step 142.

In the example shown in FIG. 12, hand cursor 150 and a button icon 152 are separated by a distance 154 on display 28. Distance 154 is approximately three times the width of hand cursor 150. Therefore, in presentation step 146, computer 26 can present hand cursor 150 moving proportionally to the movement of hand 30. In other words, as user 22 moves hand 30 a distance 156, computer 26 moves hand cursor 150 by distance 154, where distance 154 comprises three times the width of the hand cursor.

In some embodiments, computer 26 can present hand cursor 150 as a semi-realistic hand, and change the hand cursor's appearance as user 22 moves hand 30 along Z'-axis 102. By changing the appearance of hand cursor 150, computer 26 can convey visual feedback to user 22. For example, as user 22 performs a Touch gesture to "push" button icon 152, computer 26 can present hand cursor 150 with one or more fingers bent back.

In an alternative embodiment, computer 26 can present a combination of ring cursor 120 and hand cursor 150 on display 28. Hand cursor 150 can provide depth feedback by altering the size of the hand cursor based on the position of hand 30 along Z' axis 102, and ring cursor 120 can provide feedback to the hand's location on X'-Y' plane 100. Maintaining the size of ring cursor 120 constant conveys feedback while the user positions hand 30 on X'-Y' plane 100 (e.g., positioning the hand to engage a specific icon). Alternatively, user interface can present visual effects such as crosshairs in the ring cursor or glowing fingertips in the hand cursor to help user 30 position hand 30 on X'-Y' plane 100.

While FIGS. 11 and 12 illustrate computer 26 presenting hand cursor 150 in response to a gesture that user 22 performs with hand 30, other types (i.e., shapes) of cursors presented by computer 26 and representative of hand 30 are considered to be within the spirit and scope of the present invention. Additionally or alternatively, computer 26 may proportionally position cursor 150 in response to user 22 moving a different body part, such as a foot (not shown).

Figure 13:
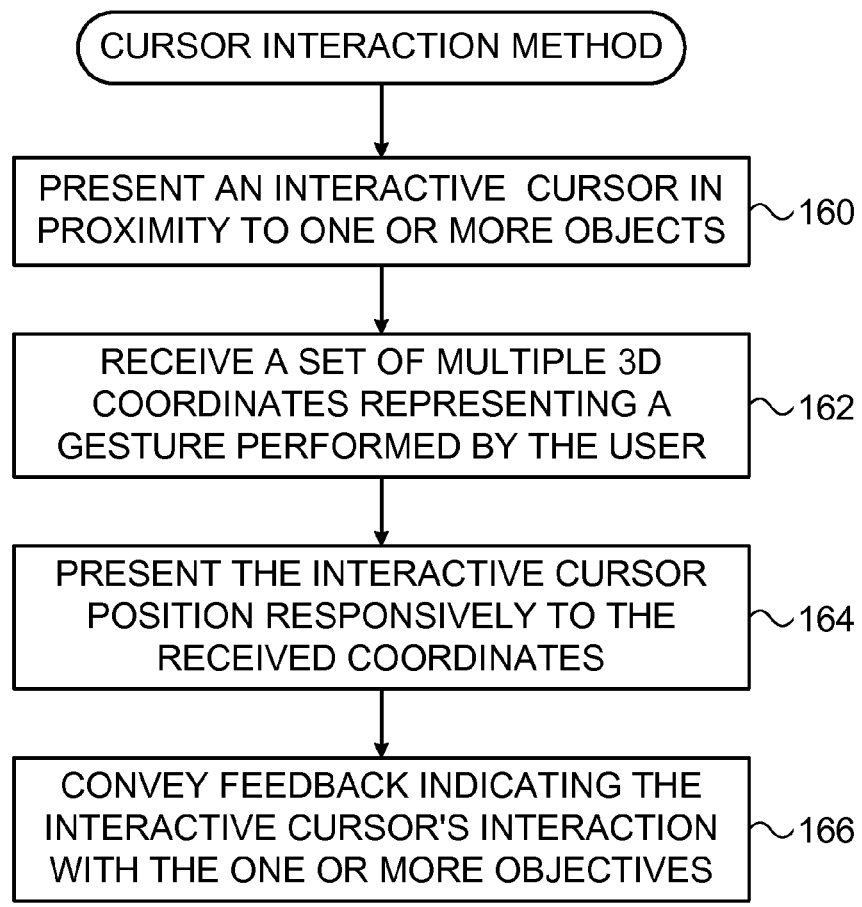
FIG. 13 is a flow diagram that schematically illustrates a method for visualizing cursor proximity to a presented item, in accordance with an embodiment of the present invention.
Figure 14:
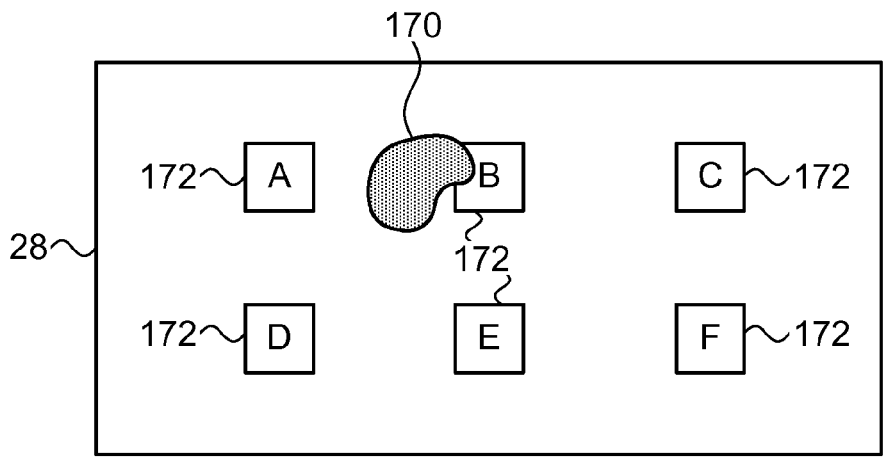
FIG. 14 is a schematic pictorial illustration of a cursor that visually interacts with items on the display, in accordance with an embodiment of the present invention.

FIG. 13 is a flow diagram that schematically illustrates a method for visualizing interaction of an interactive cursor 170 with given presented items 172, in accordance with an embodiment of the present invention, and FIG. 14 is a schematic pictorial illustration of cursor 170 interacting with one of items 172, in accordance with an embodiment of the present invention. The interaction between cursor 170 and items 172 helps compensate for the lack of tactile feedback in user interface 20.

In a presentation step 160, computer 26 presents interactive cursor 170 in proximity to items 172. In a receive step 162, computer 26 receives a set of 3D coordinates representing a gesture performed by user 22, and in a presentation step 164, the computer presents interactive cursor 170 responsively to the received coordinates. In a convey step 166, computer 26 conveys, via interactive cursor 170, feedback indicating the interactive cursor's proximity to a particular item 172, and the method continues with step 162.

In a feedback step 166, computer 26 conveys feedback (e.g., visual feedback) indicating the interactive cursor's interaction with items 172. In the example shown in FIG. 14, computer 26 can change the shape of cursor 170 by presenting cursor 170 as a "blob" (i.e., a water-drop like shape) that the computer can deform when moving the cursor over items 172. Additional examples of visual feedback (i.e., interaction) that computer 26 may present via interactive cursor 170 include:

Computer 26 may present cursor 170 as a hand, similar in appearance to hand cursor 150. As computer 26 moves cursor 170 across items 172 (in response to user 22 moving hand 30 in X'-Y' plane 100), the computer can present fingers of the cursor that move in a manner similar to fingers of hand 30 playing a piano.

Computer 26 may present cursor 170 as a geometric shape, such as a cube, a cone, a triangle, or an arrow. As computer 26 positions cursor 170 near items 172, the user interface can "tilt" the geometric shape towards the closest item.

In addition to visual feedback, computer 26 can convey audio feedback to user 22 while the user interacts with the user interface. Conveying audio feedback can help compensate for the lack of tactile feedback in user interface 20. Examples of audio feedback include:

Computer 26 can convey a low frequency clicking sound when hand 30 "touches" an item (e.g., one of items 172). The audio feedback can help user 22 interact with user interface 20, even when the user is focusing on other screen elements, or engaging in a conversation.

Computer 26 can convey a low-volume hissing sound when hand 30 is in proximity on Z'-axis 102 to reference touch point 116. Computer 26 can adjust the volume of the hissing sound in proportion to hand 30's distance from the reference touch point. For example, as hand 30 moves along Z'-axis 102 towards reference touch point 116, computer 26 can increase the volume of the hissing sound, and vice versa. Additionally or alternatively, computer 26 can convey the hissing sound as hand 30 moves along X'-Y' plane 100, thereby mimicking a sound resulting from hand 30 rubbing on a physical surface.

It will be appreciated that the embodiments described above are cited by way of example, and that the present invention is not limited to what has been particularly shown and described hereinabove. Rather, the scope of the present invention includes both combinations and subcombinations of the various features, including the transformations and the manipulations, described hereinabove, as well as variations and modifications thereof which would occur to persons skilled in the art upon reading the foregoing description and which are not disclosed in the prior art.

We claim:

1. A method, comprising:
  receiving, by a computer executing a non-tactile three dimensional (3D) user interface, a set of 3D coordinates representing a gesture performed by a limb of a user, wherein the limb is positioned within a field of view of a sensing device coupled to the computer and includes a joint, the set of 3D coordinates comprising first multiple points measured in a fixed 3D coordinate system local to the sensing device, the fixed 3D coordinate system having a first depth axis;
  upon the set of the 3D coordinates indicating that a motion of the joint has exceeded a specified threshold, transforming the first multiple points that indicate the limb to be moving along the first depth axis to corresponding second multiple points along a different, second depth axis local to the user; and
  applying the second multiple points in executing the non-tactile 3D user interface.

2. The method according to claim 1, wherein the limb comprises a hand and the joint comprises an elbow associated with the hand.

3. An apparatus, comprising:
  a display; and
  a computer executing a non-tactile three dimensional (3D) user interface, and configured to receive a set of 3D coordinates representing a gesture performed by a limb of a user, wherein the limb is positioned within a field of view of a sensing device coupled to the computer and includes a joint, the set of 3D coordinates comprising first multiple points measured in a fixed 3D coordinate system local to the sensing device, the fixed 3D coordinate system having a first depth axis, and upon the set of the 3D coordinates indicating that a motion of the joint has exceeded a specified threshold, to transform the first multiple points that indicate the limb to be moving along the first depth axis to corresponding second multiple points along a different, second depth axis local to the user, and to apply the second multiple points in executing the non-tactile 3D user interface.

4. The apparatus according to claim 3, wherein the limb comprises a hand and the joint comprises an elbow associated with the hand.

5. A computer software product comprising a non-transitory computer-readable medium, in which program instructions are stored, which instructions, when read by a computer executing a non-tactile three dimensional user interface, cause the computer to receive a set of 3D coordinates representing a gesture performed by a limb of a user, wherein the limb is positioned within a field of view of a sensing device coupled to the computer and includes a joint, the set of 3D coordinates comprising first multiple points measured in a fixed 3D coordinate system local to the sensing device, the fixed 3D coordinate system having a first depth axis, and upon the set of the 3D coordinates indicating that a motion of the joint has exceeded a specified threshold, to transform the first multiple points that indicate the limb to be moving along the first depth axis to corresponding second multiple points along a different, second depth axis local to the user, and to apply the second multiple points in executing the non-tactile 3D user interface.

6. A method, comprising:
  presenting, by a computer executing a non-tactile three dimensional (3D) user interface, a cursor, having a given cursor size, in proximity to one or more items on a display;
  receiving in the computer, from a sensing device, a set of 3D coordinates representing a gesture performed by a body part of a user positioned within a field of view of the sensing device;
  calculating a ratio between the cursor size and a body part size of the body part that performed the gesture; and
  moving the cursor responsively to the received set of the coordinates in proportion to the calculated ratio.

7. The method according to claim 6, wherein the body part comprises a hand.

8. An apparatus, comprising:
  a display; and
  a computer executing a non-tactile three dimensional (3D) user interface, and configured to present a cursor, having a given cursor size, in proximity to one or more items on the display, to receive in the computer, from a sensing device, a set of 3D coordinates representing a gesture performed by a body part of a user positioned within a field of view of the sensing device, to calculate a ratio between the cursor size and a body part size of the body part that performed the gesture, and to move the cursor responsively to the received set of the coordinates in proportion to the calculated ratio.

9. The apparatus according to claim 8, wherein the body part comprises a hand.

10. A computer software product comprising a non-transitory computer-readable medium, in which program instructions are stored, which instructions, when read by a computer executing a non-tactile three dimensional user interface, cause the computer to present a cursor, having a given cursor size, in proximity to one or more items on the display, to receive in the computer, from a sensing device, a set of 3D coordinates representing a gesture performed by a body part of a user positioned within a field of view of the sensing device, to calculate a ratio between the cursor size and a body part size of the body part that performed the gesture, and to move the cursor responsively to the received set of the coordinates in proportion to the calculated ratio.

11. A method, comprising:

presenting, by a computer executing a non-tactile three dimensional (3D) user interface, an interactive cursor shaped as a hand in proximity to one or more items on a display;

receiving in the computer, from a sensing device, a set of 3D coordinates representing a gesture performed by a user positioned within a field of view of the sensing device;

positioning the interactive cursor on the display responsively to the received set of the coordinates; and conveying feedback to the user, responsively to the received set of the coordinates, indicating a proximity of the cursor to the one or more items, wherein a disposition of one or more fingers of the hand changes responsively to a distance of the cursor from the one of the items.

12. The method according to claim 11, wherein the feedback further comprises a sound.

13. An apparatus, comprising:

a display; and a computer executing a non-tactile three dimensional (3D) user interface, and configured to present an interactive cursor shaped as a hand in proximity to one or more items on the display, to receive in the computer, from a sensing device, a set of 3D coordinates representing a gesture performed by a user positioned within a field of view of the sensing device, to position the interactive cursor on the display responsively to the received set of the coordinates, and to convey feedback to the user, responsively to the received set of the coordinates, indicating a proximity of the cursor to one of the items, wherein a disposition of one or more fingers of the hand changes responsively to a distance of the cursor from the one of the items.

14. The apparatus according to claim 13, wherein the feedback further comprises a sound.

15. A computer software product comprising a non-transitory computer-readable medium, in which program instructions are stored, which instructions, when read by a computer executing a non-tactile three dimensional user interface, cause the computer to present an interactive cursor shaped as a hand in proximity to one or more items on a display, to receive in the computer, from a sensing device, a set of 3D coordinates representing a gesture performed by a user positioned within a field of view of the sensing device, to position the interactive cursor on the display responsively to the received set of the coordinates, and to convey feedback to the user, responsively to the received set of the coordinates, indicating a proximity of the cursor to one of the items, wherein a disposition of one or more fingers of the hand changes responsively to a distance of the cursor from the one of the items.

* * * * *